Sept. 26, 1967 J. P. MAHONEY, JR 3,343,454

PROJECTING APPARATUS HAVING A ROTARY SLIDE TRAY AND A MAGNETIC SLIDE CHANGE MECHANISM

Filed Aug. 16, 1965 18 Sheets-Sheet 1

INVENTOR.
JOHN P. MAHONEY, JR.

INVENTOR.
JOHN P. MAHONEY, JR.

INVENTOR.
JOHN P. MAHONEY, JR.

INVENTOR.
JOHN P. MAHONEY, JR.

INVENTOR
JOHN P. MAHONEY, JR.
BY
John Shaw Stevenson
AGENT.

INVENTOR
JOHN P. MAHONEY, JR.
BY
John Shaw Stevenson
AGENT.

INVENTOR.
JOHN P. MAHONEY, JR.
BY
John Shaw Stevenson
AGENT.

INVENTOR.
JOHN P. MAHONEY, JR.
BY
John Shaw Stevenson
AGENT

INVENTOR.
JOHN P. MAHONEY, JR.
BY
John Shaw Stevenson
AGENT.

INVENTOR
JOHN P. MAHONEY, JR.
BY
John Shaw Stevenson
AGENT.

INVENTOR
JOHN P. MAHONEY, JR.
BY
John Shaw Stevenson
AGENT.

INVENTOR.
JOHN P. MAHONEY, JR.
BY
John Shaw Stevenson
AGENT.

INVENTOR.
JOHN P. MAHONEY, JR.
BY
John Shaw Stevenson
AGENT.

INVENTOR.
JOHN P. MAHONEY, JR.
BY
John Shaw Stevenson
AGENT.

INVENTOR.
JOHN P. MAHONEY, JR.
BY John Shaw Stevenson
AGENT.

INVENTOR.
JOHN P. MAHONEY, JR.
BY
John Shaw Stevenson
AGENT

Sept. 26, 1967 J. P. MAHONEY, JR 3,343,454

PROJECTING APPARATUS HAVING A ROTARY SLIDE TRAY AND A MAGNETIC SLIDE CHANGE MECHANISM

Filed Aug. 16, 1965 18 Sheets-Sheet 17

INVENTOR.
JOHN P. MAHONEY, JR.

BY

John Shaw Stevenson
AGENT.

INVENTOR.
JOHN P. MAHONEY, JR.
BY
John Shaw Stevenson
AGENT.

United States Patent Office 3,343,454

Patented Sept. 26, 1967

3,343,454

PROJECTING APPARATUS HAVING A ROTARY SLIDE TRAY AND A MAGNETIC SLIDE CHANGE MECHANISM

John P. Mahoney, Jr., Wheatridge, Colo., assignor to Honeywell Inc., Minneapolis, Minn., a corporation of Delaware Filed Aug. 16, 1965, Ser. No. 480,062
11 Claims. (Cl. 88—27)

It is an object of the present invention to disclose a unique anti-slide jamming construction for a projector which will afford no opportunity for a slide that is being passed therethrough from becoming damaged by jamming.

Prior to the present invention, it has been the practice to employ power actuating apparatus, such as an electric motor, to move a slide in a continuous pushing manner from an in-tray position to a projecting position and to employ this same power actuating means to return the slide in a continuous pulling manner to the in-tray position. Experience has shown that when these power actuating means are used to push and/or to pull a slightly bent slide in this continuous manner between its in-tray and its projecting positions, the bent portion of such a slide invariably has a tendency to become jammed and further bent between the power actuating means and a stationary portion of the slide guide through which the slide is being continuously moved.

Continuously operated power actuated slide moving devices of this type also often jam a slide in the projector without the operator's knowledge. When this occurs, the next slide that is continuously pushed into the projector is forced against the slide that is already in the projector, and further bending of both slides occurs.

To obviate the aforementioned slide jamming problem, it is another object of the invention to disclose a magnetic slide actuator and a slide guide for a projector which can be advantageously employed to simultaneously guide and vertically lift a slide by its top metal clip from its in-tray to its in-gate projecting position.

To further obviate the aforementioned slide jamming problem, it is another more specific object of the invention to disclose a slide actuator of the aforementioned type and a slide guide for a projector that will give the operator guaranteed assurance that every slide that has been moved into an in-gate projecting position will thereafter be guided in a vertical plane through the projector toward and into the rim of its associated tray by the force of gravity acting on the slide actuator and that the slide will be returned to the tray in the same condition it was in before it left the tray.

When a slide at room temperature is placed in a projector in the space that is conventionally assigned to it, which is at a fixed correctly focused distance from the projecting lens, the intense heat of the projector light that is directed through the slide for viewing causes the slide film material to expand and to be longitudinally displaced to an out of focus position. Some commercially-available projectors are purposely constructed so that they will allow the aforementioned slide displacing effect that is caused by the heat dissipated from the projector lamp to initially show a non-heated slide in a non-focused position and to then establish a so-called correctly focused position in the projector into which the slide can move in a popping fashion after it has been heated by the projector lamp for a predetermined period of time.

One of the drawbacks of this type of slide projector is that it is annoying to a viewer to initially see a fuzzy unfocused image of a slide for a period of time before a clear properly focused image is shown and because an additional time-consuming manual friction introducing re-focusing adjustment of the projecting lens is often necessary after the slide has popped.

Another type of commercially-available projector allows an interval of time to elapse while a slide placed therein is heated longitudinally and displaced by the heat emitted by the projector's light source and then employs a remote projector lens driving means to move the slide to a correctly focused position by a person who is observing the condition of the image that is being projected on a screen. One of the drawbacks of this type of slide projector is that it is annoying to the viewer to initially see a fuzzy unfocused image of a slide for a period of time, to then see an almost in-focused picture and finally see a correctly focused picture after a friction introducing adjustment of a remote projector lens driving means takes place.

To provide a solution for this undesired time consuming focusing problem that is inherent in the aforementioned conventionally available projectors, it is one of the objects of the present invention to employ a motor-driven face cam and follower to drive an L-shaped projecting lens carrier that is mounted in a substantially frictionless manner on spherical bearings as a part of an automatic slide focusing apparatus for a projector that will enable the into-focus adjustment of a projecting lens to be completed with a negligible amount of friction and within the same period of time that longitudinal or popping movement of the film slide is completed.

It is another object of the present invention to employ a single split-phase reversible electric motor that can be utilized to actuate the slide lifting apparatus during a non-projecting portion of the time cycle of the projector and which can be used as a part of the aforementioned automatic focusing means to adjust the position of its lens during another portion of the projector time cycle that is allotted to the job of projecting the clearest properly focused picture of the slide that is possible to project on a screen.

It is still another object of the present invention to provide the aforementioned dual purpose split-phase reversible motor with a switch delay cut-in device that will permit the energy of the motor to be fully dissipated before the energy of the motor is allowed to be shifted from a slide lifting operation to a lens adjusting operation and vice versa.

It is still another object of the present invention to disclose an interlocking cam that is weight biased into a clockwise position to retain a tray locking tooth in engagement with two adjacent teeth formed on the rim of the tray to thereby prevent a slide tray advancing indexing mechanism from being operated until the previously-mentioned magnetic slide lifter has completed its job of returning the projected non-jammed, unbent slide to the tray.

It is another object of the present invention to provide a tray-receiving compartment of a projector with:

(1) A stub shaft which has a key mounted thereon at its outer end along which a key slot in the inner hub portion of the tray is required to travel when the tray is being mounted in the projector, and;

(2) A slot for receiving a rectilinear protuberance on the lid of the tray so that the tray and lid will always be assembled in the same initial twelve o'clock "0" slide position.

It is still another object of the invention to disclose a slide tray of the aforementioned type whose entire inner hub portion is slid over and then out of engagement with its aforementioned key as the tray is moved into the projector so that the tray can be rotated after it has been moved to its final assembled position on its stub shaft and thereby bring any selected one of the slides in the tray to a twelve o'clock position when the projector's switch is in a load position.

It is an object of the present invention to provide an electrical circuit having a single push button that can be placed in a first or "show" position so that the actuation of its associated manually-operated forward or reverse actuating switch will cause a slide that has been raised from its twelve o'clock position in the tray to its in-gate projecting position to be thereafter returned to its original twelve o'clock position in the tray and the tray locking mechanism to then be released momentarily until the tray is advanced in a step fashion in the selected forward or reverse direction and the next slide to be raised to its in-gate projecting position in one continuous, rapid operation during which time the tray can neither be manually rotated or removed from the projector.

It is another object of the invention to provide a "load" position to which the aforementioned single push-button switch in the previously-mentioned electrical circuit can be manually actuated when it is desired to have the slide returned to the tray so that the tray can be rotated while in the last-mentioned position to move any slide therein to a twelve o'clock position and to enable the tray to be removed from the projector.

It is another object of the invention to provide a series of face teeth on the solenoid-actuated clutch to connect the split phase motor in driving engagement with a slide-lifting drive bar when a slide is being moved in an unobstructed manner between its in-tray and in-gate projecting positions and which face teeth will be moved in a physical sliding ratchet manner relative to one another to produce an audible clacking signal when a slide that is being moved through the projector is brought into contact with any obstruction therein.

It is another object of the present invention to disclose a single slide holder for slidably withdrawing a slide from an in-projector in-gate projecting position to a position that is on one side of the projector for the purpose of editing any one of the slides in the tray without removing the tray from its inserted position in the projector.

It is another object of the present invention to provide an interlocking cam which will lock the slide-editing plate in the projector so that the editing plate cannot be removed therefrom to one side of the projector for a slide-editing operation during the time in which the slide-actuating mechanism is moving the slide toward and partially into or partially out of and away from its in-gate projecting position.

It is still another object of the present invention to disclose a unique single slide holder of the aforementioned type that will allow slides other than those in the tray which contain no magnetic clip to be substituted for a tray slide that is being projected by merely pulling the slide holder out of one side of the projector, making a substitute slide change and moving the holder containing the new slide back into the projector for viewing.

It is another object of the present invention to provide a safety interlocking mechanism which will prevent the slide lifting apparatus from being returned to its tray by gravity and the next slide from being advanced in the tray to a projecting position when the slide is in the aforementioned editing or outside projector out-gate position.

It is another object of the present invention to disclose a shutter actuating device that is constructed to cut off the light of the projector from being shown on the screen during the instant of time that extends between the time a first slide is moved out of its projector position to the instant of time another slide is moved into its projecting position.

A better understanding of the present invention may be had from the following detailed description when read in connection with the accompanying drawings in which.

Figure 1:
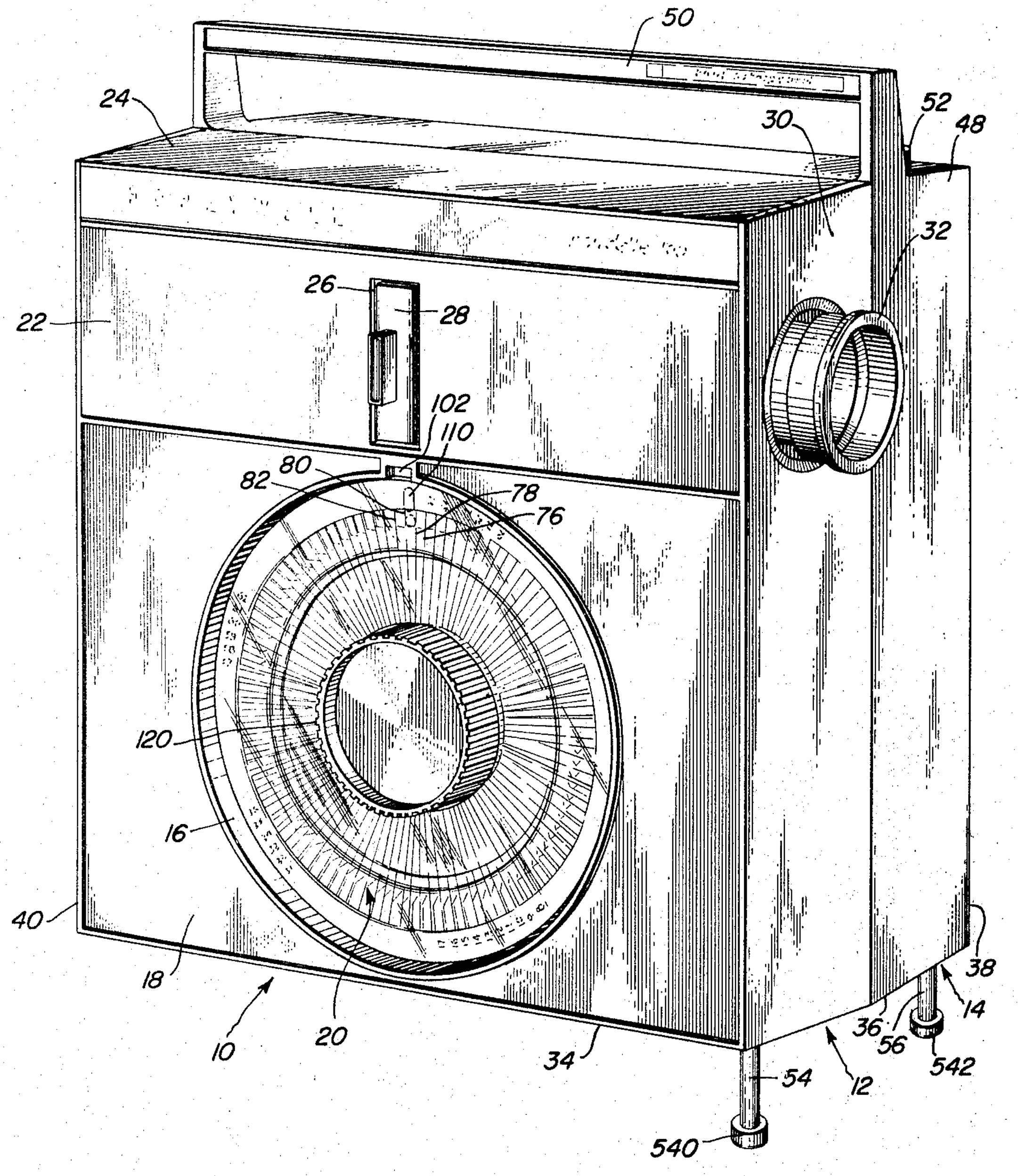
FIGURE 1 shows a prospective view of the projector.
Figure 2:
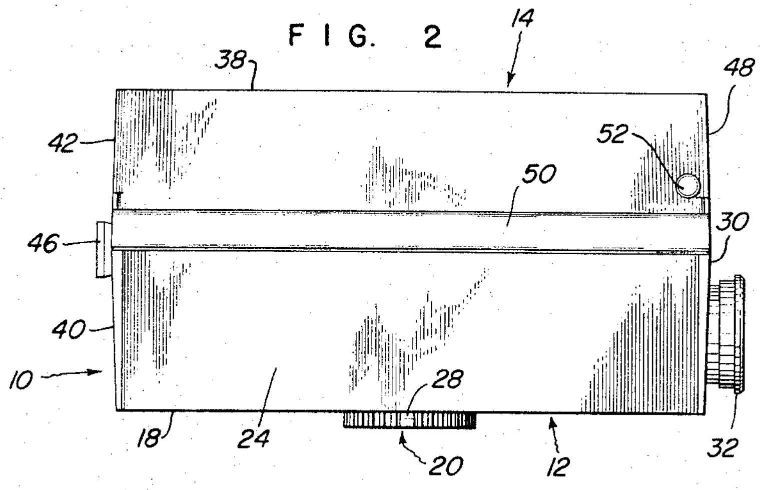
FIGURE 2 is a top view of the projector.

The rotary slide projector 10 shown in FIGURES 1–4 of the drawing is comprised of a front half casing portion 12 and a rear half casing portion 14. The front half casing portion 12 has a ring-shaped wall 16 extending inwardly from a lower front surface 18 thereof for retaining a rotary slide tray 20 therein. The upper part 22 and the top part 24 of the front casing portion 12 is of a separate angular single part construction and has a wall 26 forming an opening therein to accommodate the sliding of the slide editing gate 28 therethrough.

The right side 30 of the front half casing portion 12 of the projector 10 is shown having a projecting lens 32 extending therethrough. The entire base part 34 of the front half casing portion 12 is shown tapered in an upward and outward direction between the part that contacts the rear half casing portion 14 and the portion of the base that contacts the lower front surface 18.

The entire base part 36 of the rear casing portion 14 is also shown tapered in an upward and outward direction between the part that contacts the front half casing portion 12 and the portion of the rear end of the base part 36 that contacts the lower end of the back surface 38 of the rear half casing portion 14.

The upper left side of the projector 10 is formed by two contacting wall portions 40, 42 that form respective parts of the front and rear half casing portions 12 and 14. The lower left side of the projector 10 is formed of a single slidable door plate portion 44 having a handle 46 thereon that can be moved in an upward vertical direction to a position that is immediately behind its contacting wall portions 40, 42. This door 44 provides access to a compartment (not shown) that contains a slide tray loading switch, a slide showing switch and a switch for either showing the slides in tray in immediate consecutive forward manner, a switch for showing the slides in the tray in a reverse sequence and an electrical power plug-in wire connection which is necessary to supply an electrical current to the projector 10.

The upper right and left side wall portions 42, 48 of the rear half casing portion 14 of the projector 10 have portions that are integral therewith which extend upwardly therefrom to form a projector handle 50.

A push button 52 extends through an aperture 54 in the top surface of the rear half casing portion 14 of the projector 10 to move a linkage hereinafter described which will adjust the position of two legs 54, 56 against a level or non-level surface on which the projector 10 is placed.

Figures 3, 4:
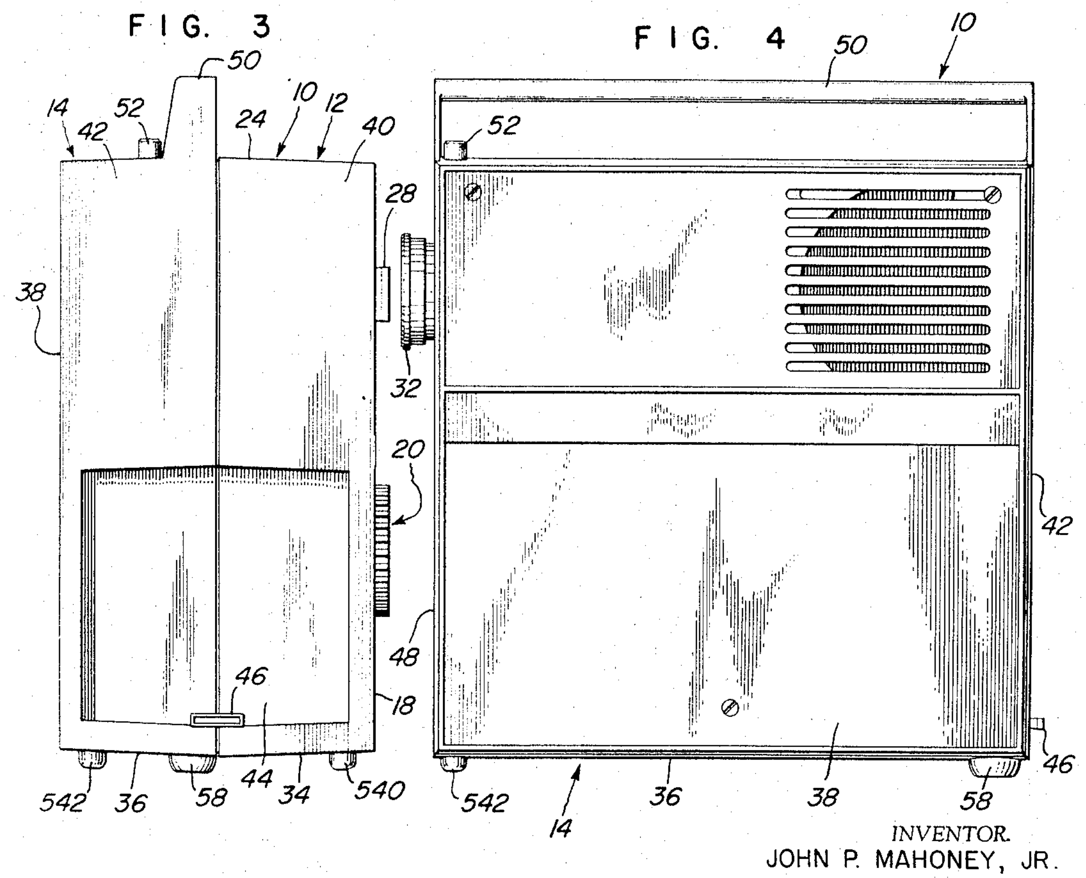
FIGURE 3 is a left side view of the projector.
FIGURE 4 is a back view of the projector.
Figure 5:
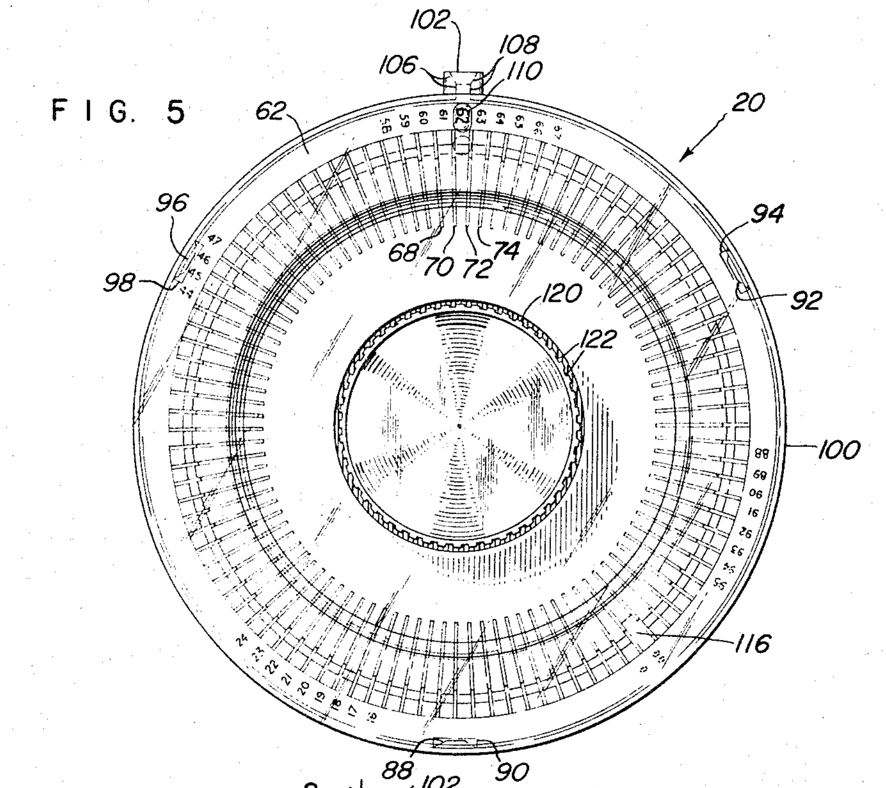
FIGURE 5 shows in detail a front view of a circular tray that is retained within the aforementioned projector.
Figure 6:
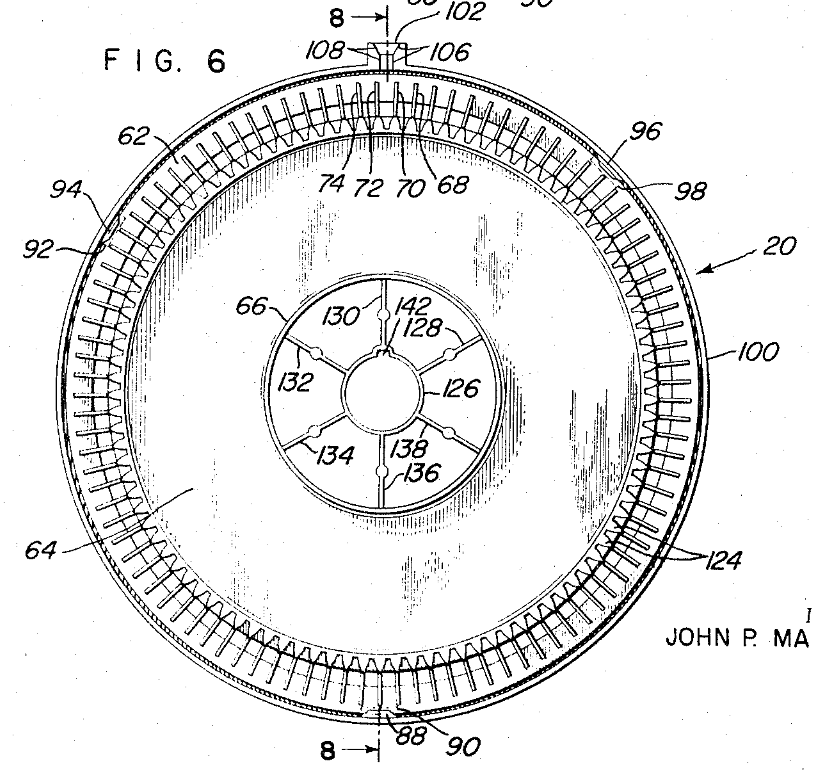
FIGURE 6 is a back view of the tray.
Figures 7, 8:
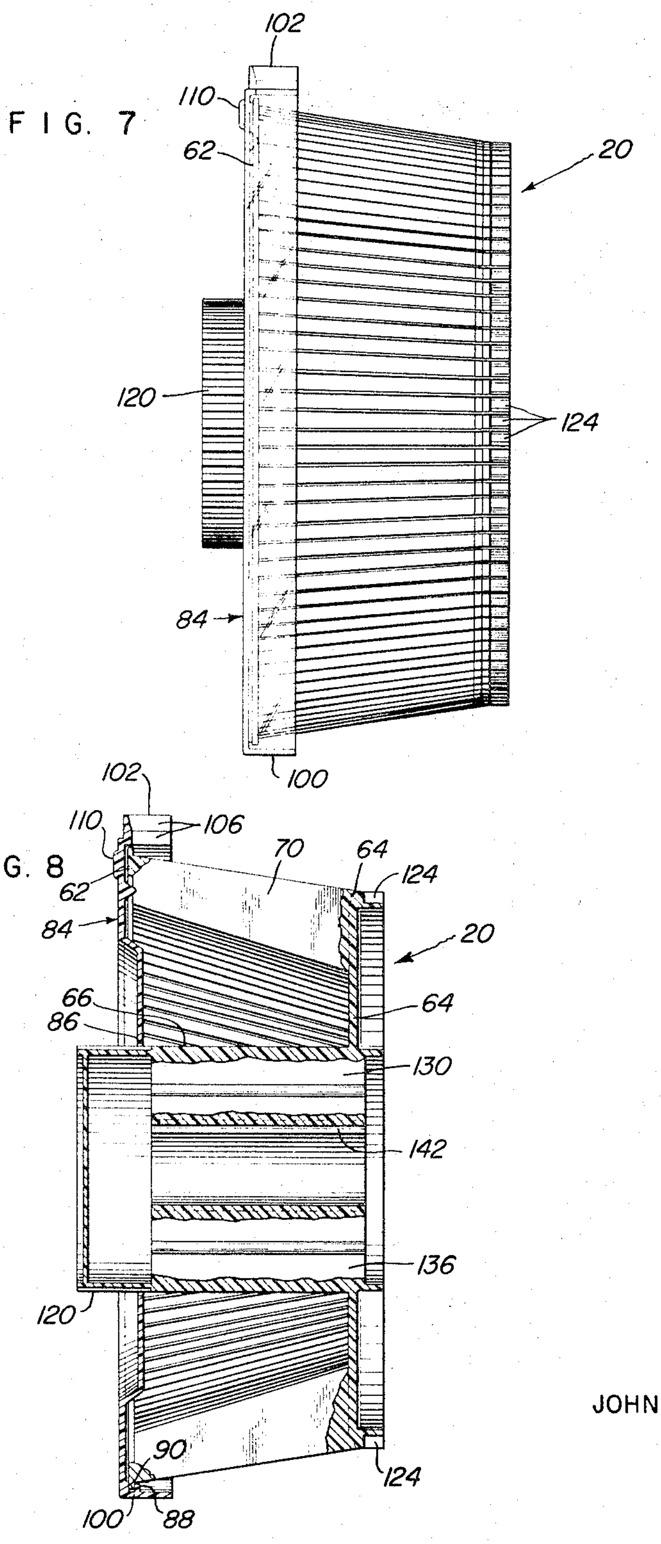
FIGURE 7 is a side view of the tray.
FIGURE 8 is a section taken along the line 8—8 of FIGURE 6 with the top front plate removed.

These legs 54, 56 are shown extending through the respective tapered base parts 34, 36 of the front and rear half casing portions 12 and 14 while the projector 10 is pivoted about stationary resilient foot 58 that is shown in FIGURE 3. The tapered base parts will thus enable the projector to be placed in a position in which the front half of the casing portion is upward and spaced away from a non-level support surface or vice versa.

*Rotary slide tray*

The previously-mentioned rotary slide tray 20 shown in FIGURES 1 and 5–8 is comprised of two spaced-apart circumferential side ring and disc portions 62, 64 that are of different diameters and that are integrally joined together at their central portions by means of a hub 66.

A series of substantially equally spaced apart radially oriented spacer plates 68, 70, 72, 74 are also joined together in an integral manner with the outer circumferential side ring and disc portions 62, 64. These spacer plates 68–74 are purposely positioned adjacent the circumferential ring and disc portions 62, 64 of the tray 20 in order to allow the inner end of the slides, for example the slides 76, 78, 80 and 82 shown in FIGURE 1 that are to be dropped from a position that is located outwardly from the peripheral portion of the tray into a load position so that their inner ends are in contact with the hub 66 and brought into extremely close proximity with one another.

It can thus be seen from FIGURE 1 that such a tray construction will enable many more slides to be mounted in a much smaller tray than has heretofore been possible when other types of commercially-available trays are used.

It can also be seen by observing FIGURE 1 that since the spacer plates, for example 68, 74, are positioned between spaced-apart side ring and disc portions 62, 64 of the tray 20 that are purposely made of considerably different diameters, the slides can, therefore, be readily inserted and removed from the tray 20 in a substantially frictionless manner. Such a tray construction, therefore, considerably reduces the frictional slide spacer rubbing effect that has heretofore been encountered with trays that have side ring portions that are of the same diameter.

The rotary slide tray 20 is also provided with a bendable transparent cup-shaped slide selecting indexing lid 84. The indexing lid 84 has a wall 86 forming an aperture in its central portion to enable the slide indexing tray 20 to be rotated about its outer hub portion 66.

An inner surface adjacent the outer circumferential part of the lid 84 is provided with three pair of arc-shaped lug portions 88, 90; 92, 94, and 96, 98 which protrude from the inner side wall and the inner base surface of the cup-shaped lid 84. The lug portions 88–98 are located in a position with respect to the ring portion 62 that allows the lid to be snapped into a slide retaining position on the ring portion 62. These lug portions 88–98 also provide guiding surfaces along which the lid 84 can rotatably slide along the tray portion 62 when a slide indexing operation takes place.

The indexing lid 84 also has a circular flange portion 100 and a rectangular protuberance 102 that extends in an outward direction therefrom that acts as a removable twelve o'clock indexing key when inserted into the slide 104 of the projector 10 that is shown in FIGURE 1 of the drawing. This protuberance 102 contains two spaced-apart wall portions 106, 108 that form a slot therein. The slot formed by the walls 106, 108 provides the only passageway in the lid 84 through which a slide in the tray 20 can be removed when the lid has been snapped onto the left side of the tray 20.

The lid also contains a raised magnifying portion 110 which can be aligned with any one of the slide identifying embossed numbers, for example "62," that are formed on the flat ring portion 62 of the tray 20.

A part of the space between these spacer plates 112, 114 identified as "00" on the tray is shown filled in at 116 so that no slide can be inserted therein or removed from the tray 20 when the tray is not being used and the side wall portions 106, 108 have been brought into side alignment with "00."

The entire front outermost peripheral surface 120 of the outer hub portions 66 of the tray 20 is shown containing a series of grooves 122 to form a hand grip by which the tray 20 can be rotated relative to the lid 84 and to allow any selected slide in the tray to be moved into alignment with the slide emitting slot 106, 108 in the lid 84.

The entire rear outermost peripheral surface of the tray 20 contains a series of teeth 124 thereon for indexing which will be hereinafter described.

Figure 11:
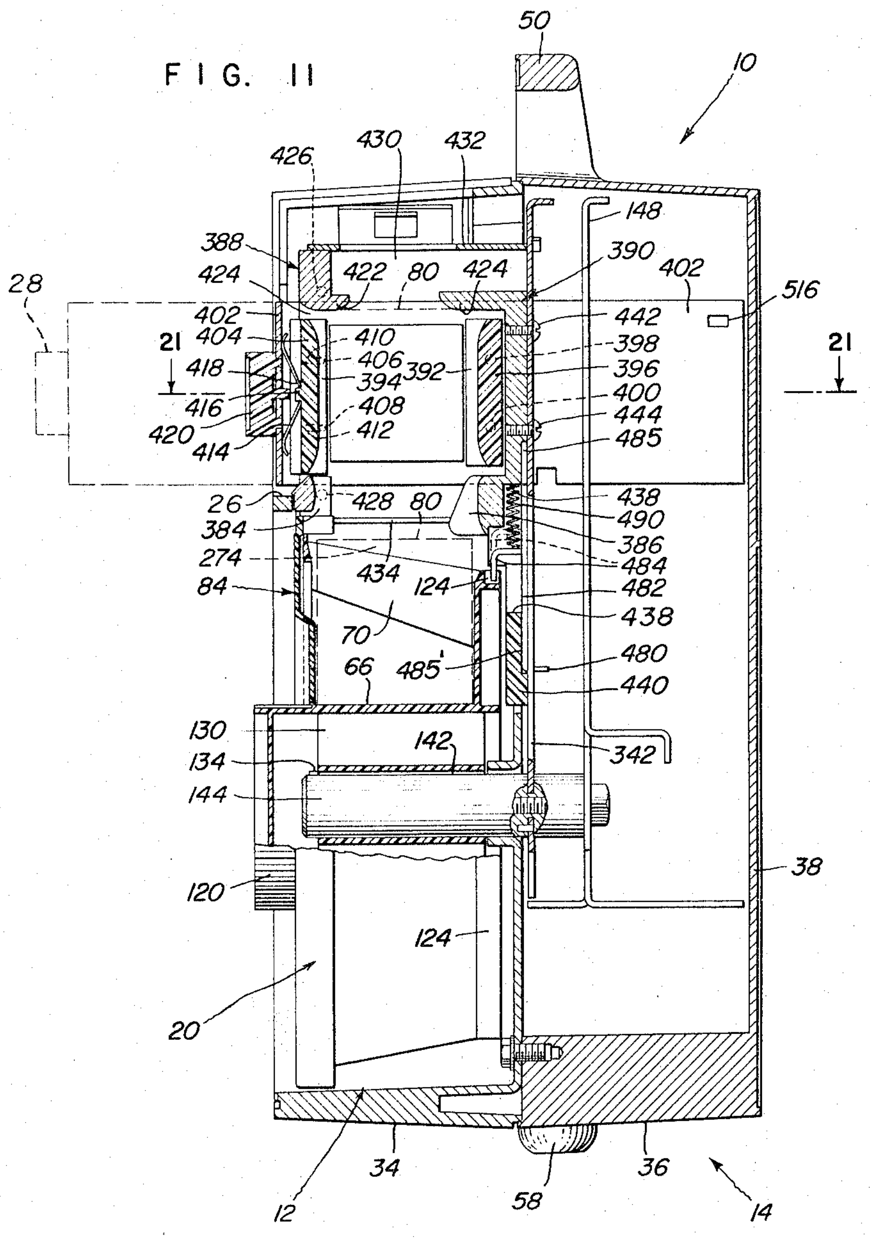
FIGURE 11 shows a vertical section taken along section line 11—11 of FIGURE 9.

The outer hub 66 is joined to the inner hub portion 126 by means of a series of identical rib support members 128–138. The inner hub portion contains a keyed-out slot 142 to allow the tray 20 to be slidably moved into the projector over a key 143 that is fixedly connected to the outer end of a stationary shaft 144 as is shown in FIGURE 11. This will require the rectangular protuberance 102 on the lid 84 to always be moved to its twelve o'clock or "0" position before the tray and the lid can be slid into its assembled position within the projector 10. Once the tray 20 is assembled on the shaft 144 in the aforementioned manner the left end of the inner hub 126 will be moved to the right of the key 143 so that it can be rotated about the stub shaft 144.

*Multiple function of motor*

The projector to be hereinafter disclosed in detail is unique in that it only requires a single split-phase electric motor having a single solenoid operated clutch to supply the necessary energy that is required:

(1) To actuate an automatic projecting lens focusing mechanism during one instant of projector time;

(2) To actuate a slide raising mechanism during another instant of projector time;

(3) To actuate a mechanism that will cause a shutter to be moved between the projector's light source and the projector's lens at another instant of time;

(4) To actuate still another mechanism for moving a tray locking tooth actuator out of engagement with an indexing gear on an outer ring portion of the tray after a slide that has been projected is returned by gravity to the tray, and;

(5) To actuate a tray moving mechanism that will rotate the tray through a preselected angle to a position in which the next slide to be shown is moved into a twelve o'clock position.

*Multiple function of motor (1) auto-focus function of motor*

Figure 10:
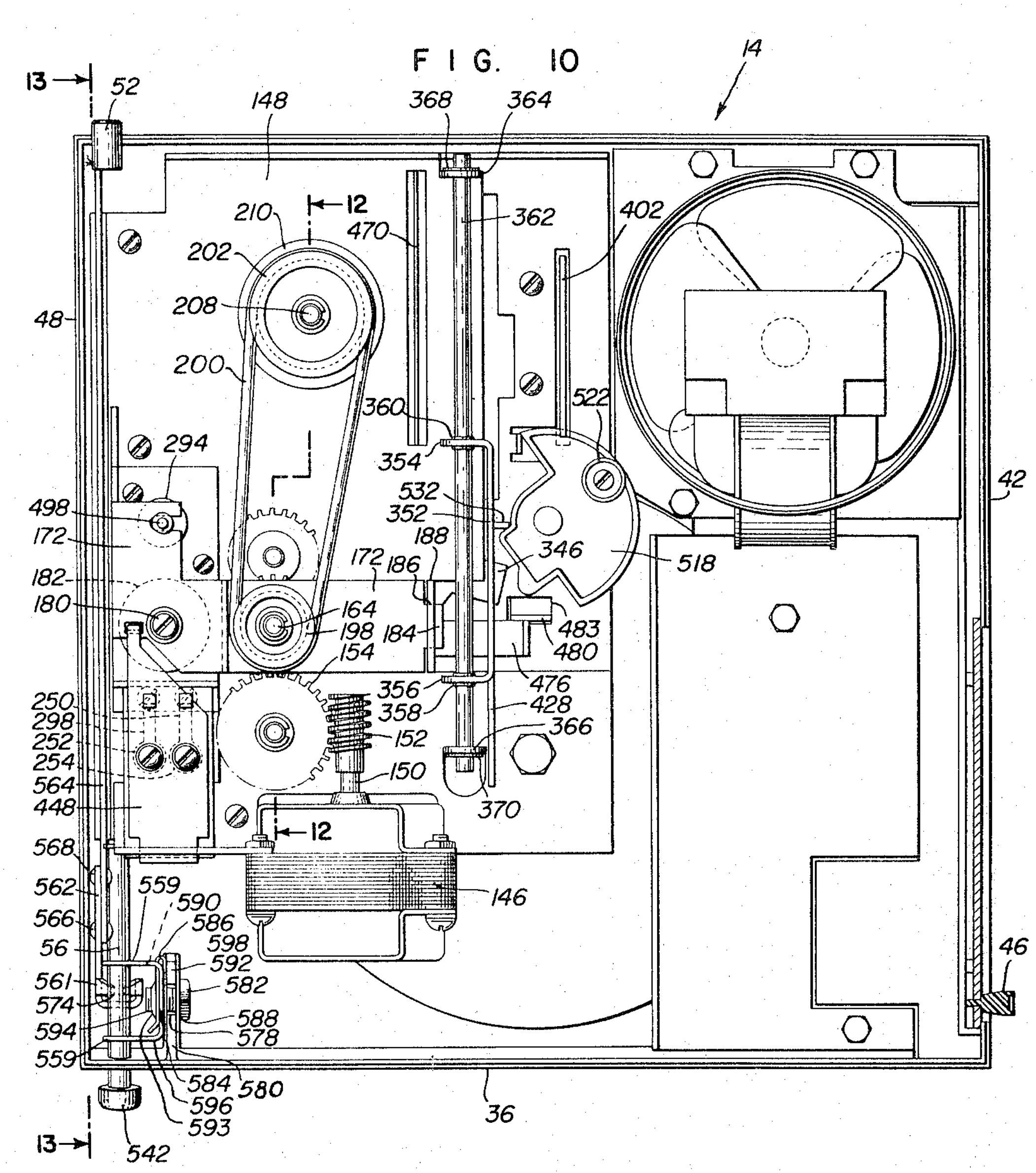
FIGURE 10 shows a rear view of the projector.
Figure 12:
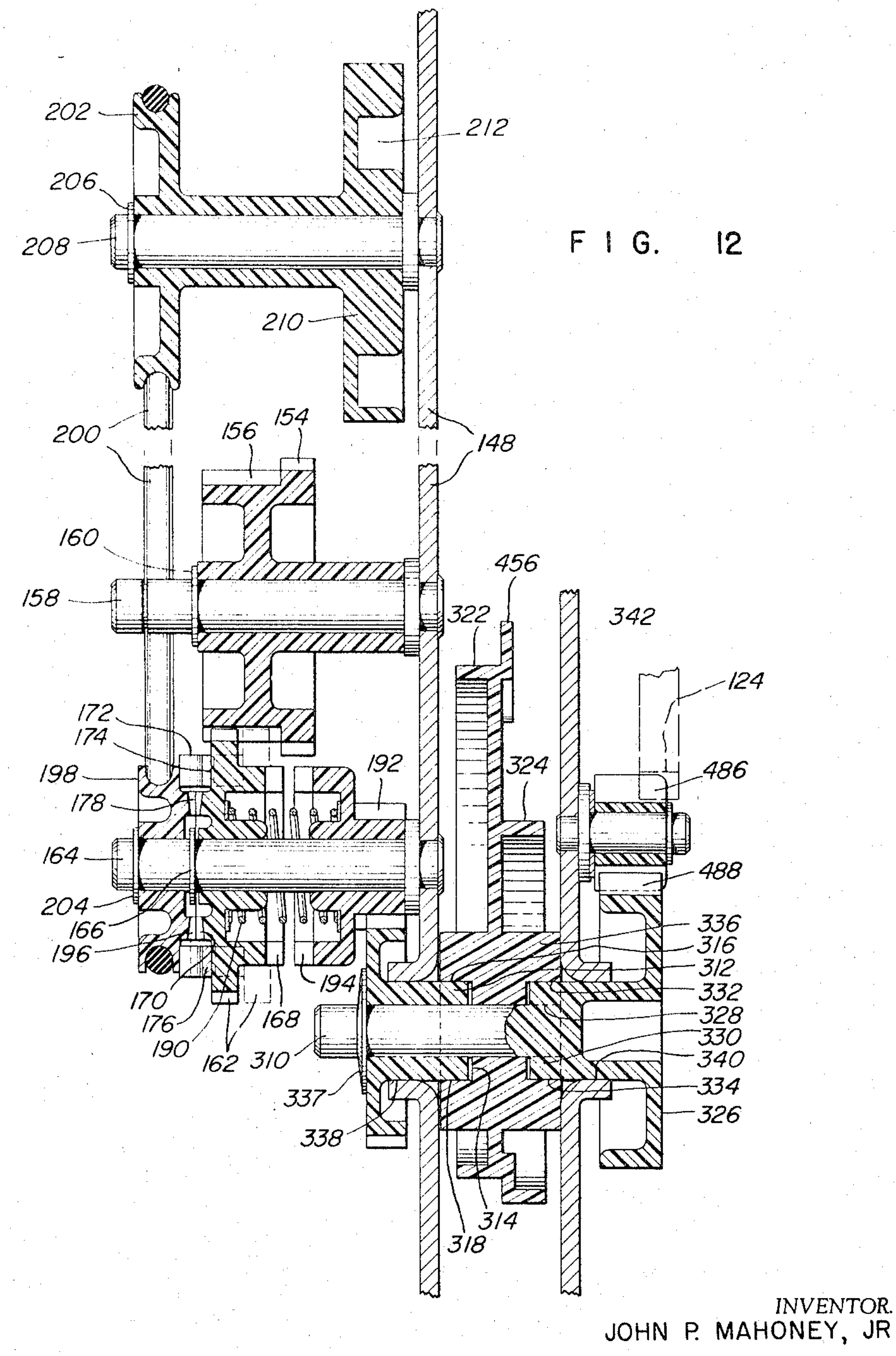
FIGURE 12 is a sectional view taken along the line 12—12 of FIGURE 10.

The A.C. motor 146 used to perform the aforementioned function is a split-phase type. This motor 146 is mounted on a rear chassis plate 148 and is best shown in FIG. 10 that discloses a rear view of the projector 10. The shaft 150 of the motor 146 has a worm 152 fixedly mounted thereon to rotate therewith in a clockwise and counter-clockwise direction. The worm 152 is in mesh with a worm wheel 154 of a preselected diameter in order to act as a motor speed reducing unit. FIG. 12 shows the worm wheel 154 and a spur gear 156 that is integral therewith is freely mounted for rotation on a stationary stub shaft 158 which shaft is fixedly mounted on a stationary support plate 148.

The gears 154, 156 are retained in position on the shaft 158 by means of a snap-on gear retaining ring 160. The spur gear 156 is in splined driving engagement with a second spur gear 162 that, in turn, is mounted in a slidable and rotatable fashion on another stationary stub shaft 164.

All of the worm and gear driving parts that have been previously described and which will hereinafter be described are constructed on a plastic material trade named nylon, or from an equivalent material.

FIG. 12 shows that the second spur gear 162 is prevented from sliding toward the left end of the shaft by means of a snap-on gear retaining ring 166. The gear 162 has a first series of circumferentially spaced-apart molded face clutch teeth 168 forming an annular right end face surface portion thereof and a second series of circumferentially spaced-apart molded clutch teeth 170 forming an annular left end surface thereof.

A lever 172 is shown in FIG. 12 in the form of a bent plate which has two V-shaped portions 174, 176 formed therein. The points of these V-shaped portions 174, 176 are shown in engagement with two opposite flat left side face portions of the gear 162. A circular wall portion 178 of the plate lever 172 is shown between these V-shaped portions 174, 176 to form an aperture in the plate lever 172.

Figure 13:
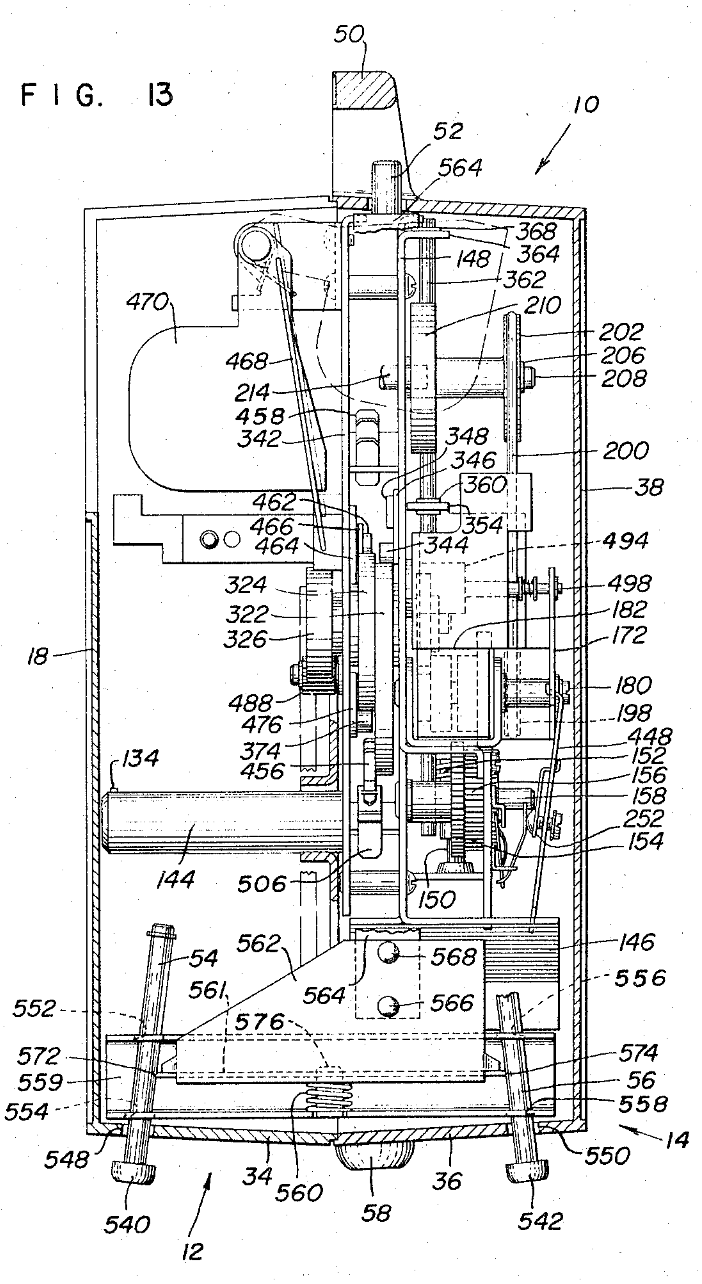
FIGURE 13 is a view partially in section taken along the line 13—13 of FIGURE 10.

FIGS. 10 and 13 show the left end of the plate lever 172 is connected for actuation by means of an actuating rod-shaped plunger 180 of a solenoid 182 that is, in turn, mounted on a chassis plate 148. The other end portion 184 of the lever 172 is pivotally supported in a wall 186 forming a slot in a bent portion 188 of the chassis plate 148.

When the motor 146 is used to perform an automatic focusing function the plunger 180 of the solenoid 182 will be moved to its outward position, the face of the spring 190 that is shown extending in compressing engagement between the right face of the gear 162 and the left face of the gear 192 that has clutch teeth 194 thereon will be in the solid line spring expanded position as shown in FIG. 12. Under this condition the clutch teeth 168 on the right face of the driven gear 162 will be retained in non-driving clutched-out engagement with the clutch teeth 194 of the gear 192 that is rotatably mounted on the stub shaft 164. Under this condition the clutch teeth 170 of the motor driven gear 162 will be forced by the spring 190 into clutched-in driving engagement with the clutch teeth 196 on the right face of the pulley 198. A belt 200 is then used to transmit the transmitted rotary motion of the motor 146 to a second pulley to 202.

A snap-on retaining ring 204 is employed to retain the pulley 198 that is mounted to rotate about the shaft 164 from sliding off its left end and another similar retaining ring 206 is employed for the same purpose with the pulley 202 that is rotatably mounted on the stationary stub shaft 208. The stub shaft 208, in turn, is shown supported on an upper portion of the previously-referred-to chassis support plate 148.

Figure 14:
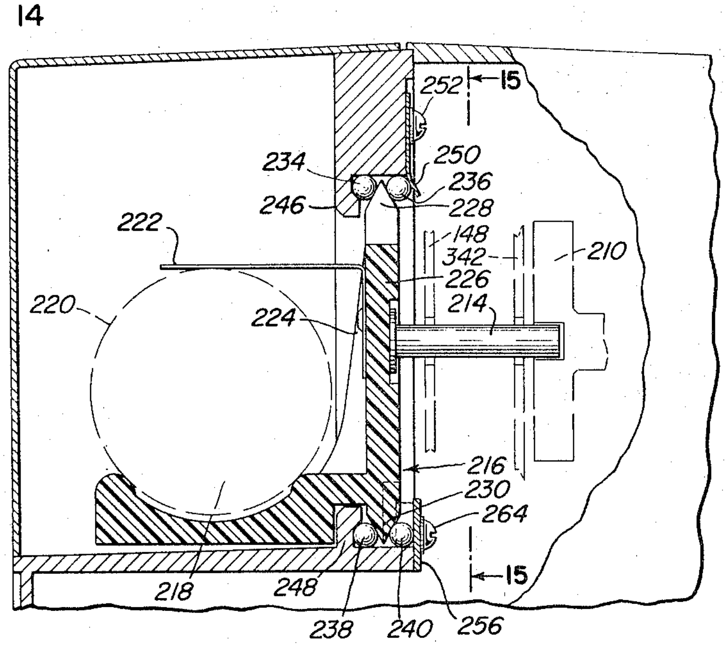
FIGURE 14 is a view showing the projector lens and how its associated cam-actuated lens carrier can move the lens from one position to another.
Figure 21:
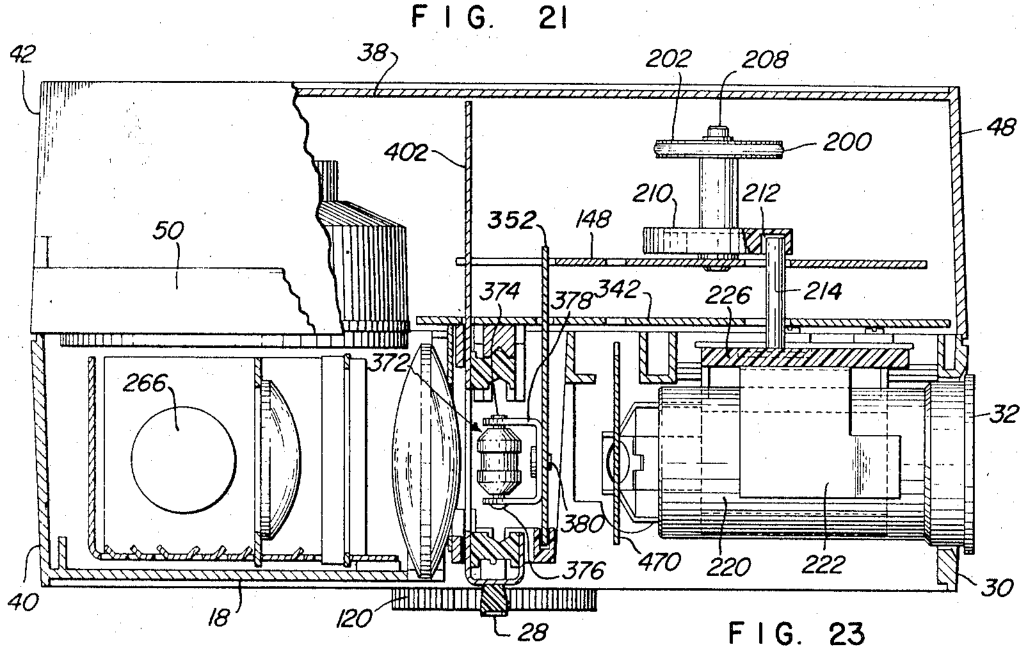
FIGURE 21 shows a top plan view of the slide guides as taken along the line 21—21 of FIGURE 11 and how a movable permanent magnet, such as is shown in FIGURES 16 and 25, is attached to a slide.

The face cam 210 of FIG. 12 is shown in FIGS. 13, 14 and 21 as having an eccentric grooved-out cam face portion 212 thereof in sliding rotating engagement with a metal cam follower pin 214 that is fixedly attached to a plastic L-shaped carrier-support member 216 for supporting the lower and right side portions of the barrel part 218 of a projecting lens 220.

Figure 15:
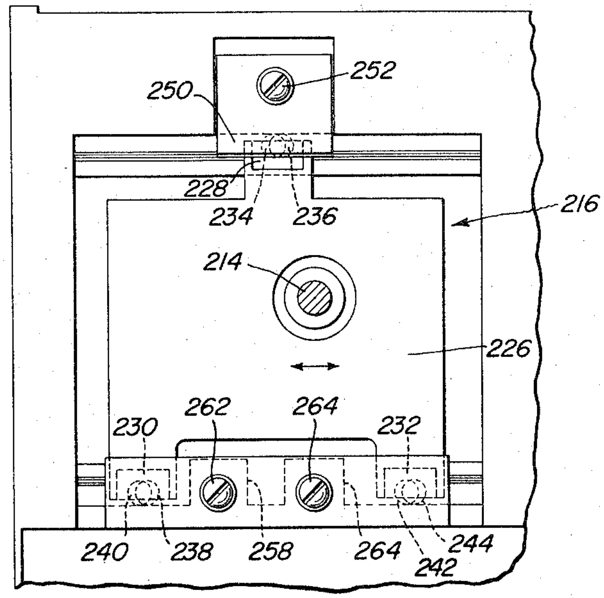
FIGURE 15 is a view along line 15—15 of FIGURE 14 showing the right end view of the lens carrier.

A metal spring plate 222 is attached by means of a rivet connection for example 224 to the vertical rectangular-shaped portion 226 of the L-shaped lens carrier-support plate 216 in order to maintain the lens 220 in a fixed position in the plate 216. The upper end and the two lower ends of the substantially rectangular-shaped portion 226 each contain a part that is shown in FIGS. 14 and 15 terminating in a V-shaped end 228, 230, 232. Each of the V-shaped ends 228, 230, 232 are supported by means of a pair of spheres 234, 236; 238, 240; 242, 244.

Appropriate elongated L-shaped portions of the chassis 246, 248 are used as seating portions against which their associated spheres 234, 240, 244 can rotate. A bent spring plate 250 is shown attached to the chassis by screws 252, 254 so that the lens 220 can be moved axially in a forward or rearward direction with the L-shaped member 216 on the spheres 234–244.

Another elongated rectangular metal strip 256 is shown attaced to the chassis portions 258, 260 by screws 262, 264.

It can be seen that the lens 220 can be driven in a forward and reverse axial direction in its L-shaped lens carrier-support member 216 to whatever distance the shape of the eccentric groove 212 in the face cam 210 is constructed to move its associated following pin 214.

Figure 9:
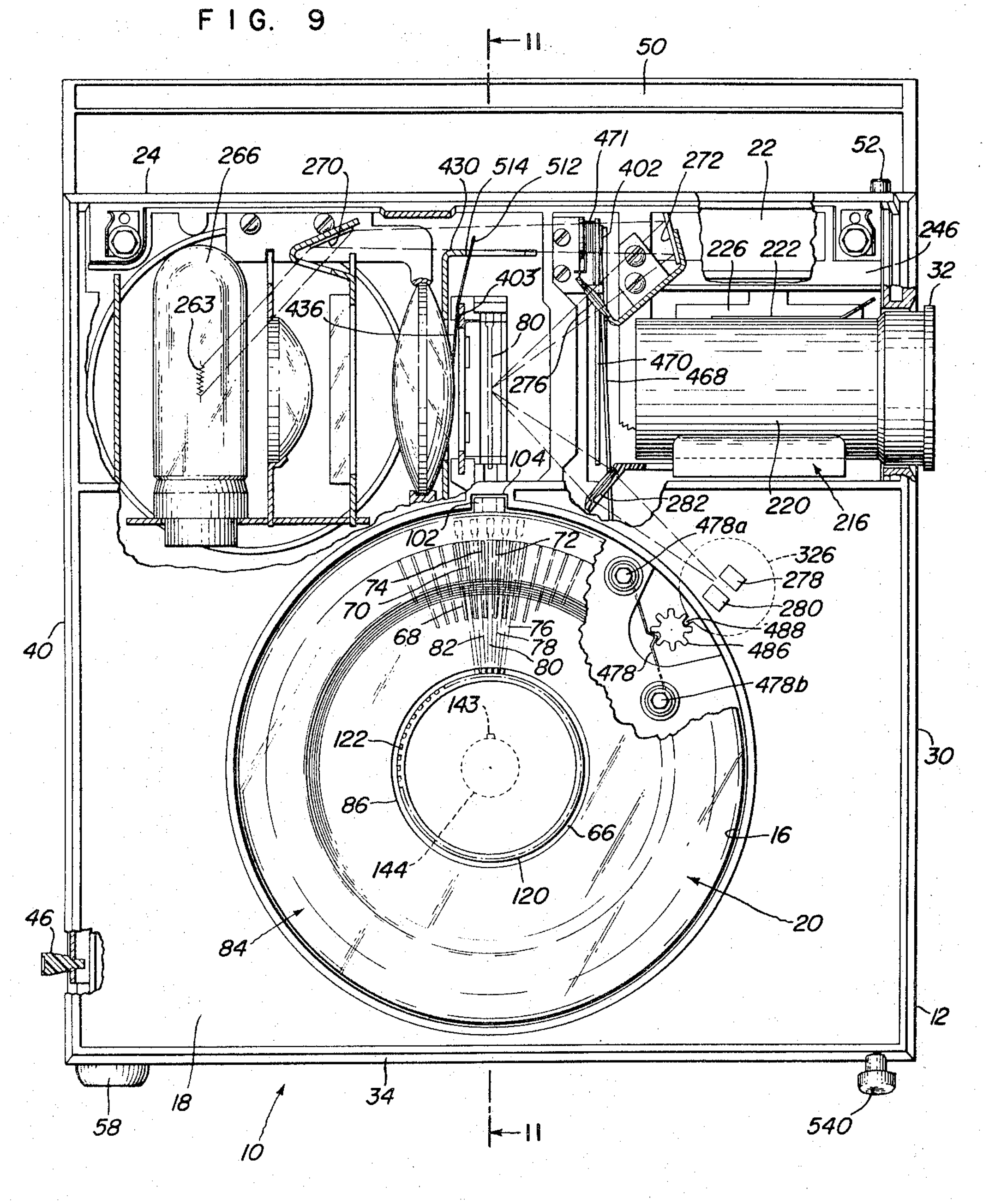
FIGURE 9 shows a front view of the projector with its back plate removed.

The auto-focus control system shown in FIG. 9 is basically similar to and operates in a similar manner as the automatic-focus control system disclosed in the Norman L. Stauffer patent application, Ser. No. 286,708, filed June 10, 1963 now Patent No. 3,249,001. The light rays from the projector lamp filament 263 of the illumination source 266 disclosed herein is reflected by the mirrors 270 and 272 and a reduced image of the filament 263 focused at the normal plane of the slide 80 by the fixed lens 276. The reflected image is re-focused in the plane of the photocells 278 and 280 by the lens 282 which is mounted on an extension of the projection of the previously-mentioned lens carrier 216. Thus, if the slide 80 is displaced from the normal position, one or other photocells 278, 280 causes the previously-referred-to motor 146 to drive the aforementioned lens carrier 216 until the image is centered between the photocells 278, 280 again and the slide 80 is brought into focus.

Figure 27:
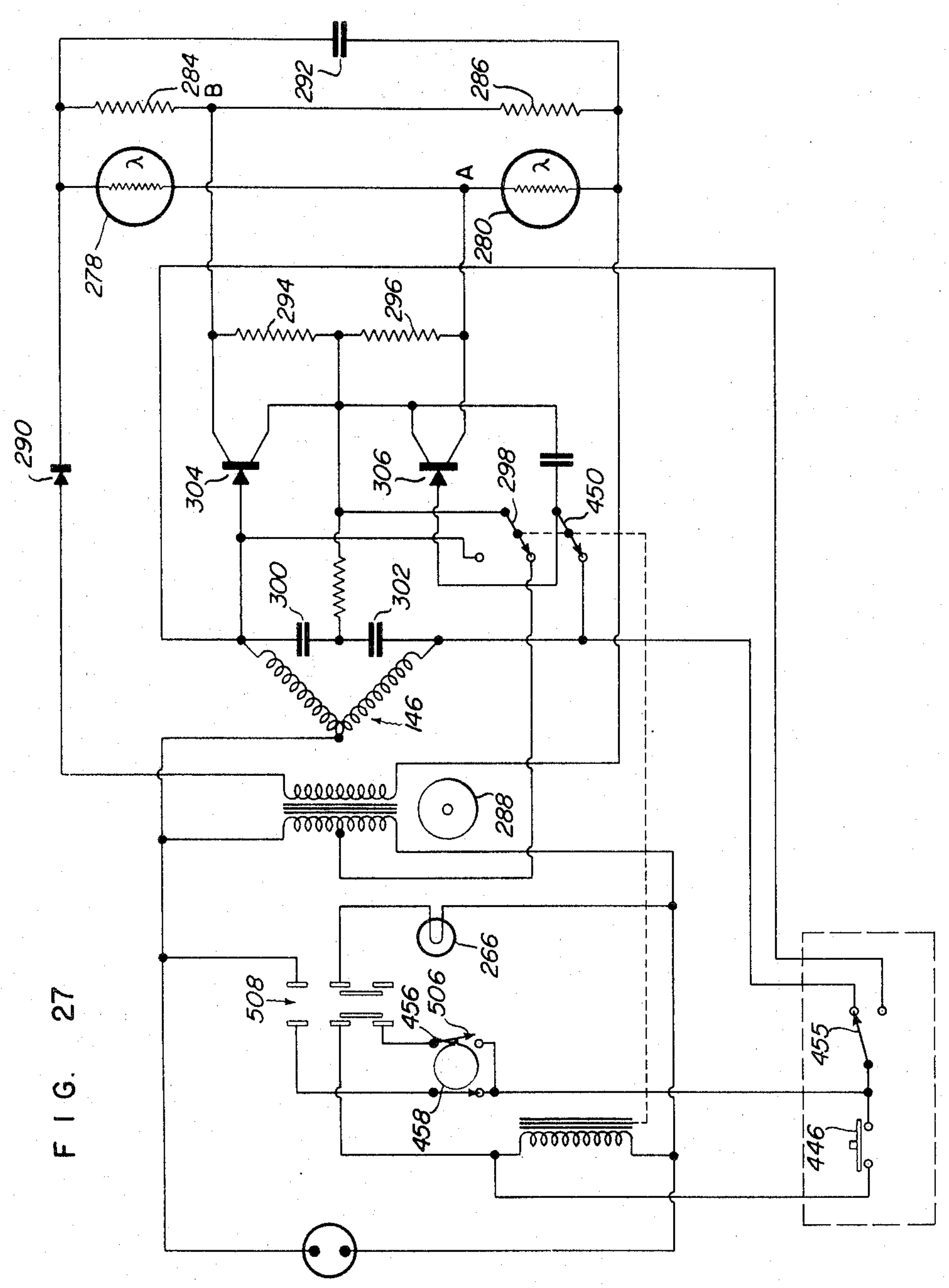
FIGURE 27 is a circuit diagram showing the relationship that exists between all of the electrical components disclosed in FIGURES 9, 10, 13 and 16.

Reference should now be made to the circuit diagram shown in FIG. 27. The two photo-conductive cells 278 and 280 form two arms of a bridge circuit, while the resistors 284 and 286 form the remaining two arms. An A.C. supply voltage from a transformer winding on the fan motor 288 is rectified by the diode 290 and filtered by the capacitor 292 and provides a D.C. voltage for the bridge circuit. When the illumination on the photocells 278, 280 is equal, the voltages at points A and B are equal and no current flows in the resistors 294 and 296 and no voltage is developed across them. When the light spot is displaced to one or the other of the photocells 278, 280 the resistance of that cell drops compared to the other cell and a difference in voltage appears between points A and B.

The split-phase motor 146 is supplied with power from a low voltage winding (25–30 volts) on the fan motor 288 through the switch 298. Two capacitors 300, 302 are connected across the motor winding so that the winding is balanced with no phase shift between them. In this condition no power is developed by the motor 146. Connected across each capacitor 300 and 302 is a silicon controlled rectifier 304, 306, the gate of one being connected to point A, while the other is connected to point B. The center point of resistors 294 and 296 is connected to the common cathodes of the two silicon-controlled rectifiers 304 and 306. The polarity of the voltage difference between A and B will depend on which of the photocells 278 and 280 is more strongly illuminated and this, in turn, will determine which of the two rectifiers 304 or 306 will conduct. With one rectifier 304 or 306 conducting, half wave voltage will be applied directly to that side of the motor winding so that a phase shift appears between the two windings and the motor 146 drives in the appropriate direction as previously explained until, via the mechanical optical system already described, the bridge is restored to balance.

*Multiple function of motor (2) slide raising mechanism*

When the motor 146 is employed to perform a slide raising function, the plunger 180 of the solenoid 182 will be energized to pull the plunger into the solenoid. When this occurs, the plate lever 172 that is connected to the outer end of the plunger 180 will be moved in the same general inwardly moving direction as the plunger about the chassis plate 188 on which its other end 184 is pivotally mounted. Movement of the lever 172 in this fashion will, in turn, cause its V-shaped portions 172, 174 that are in contact with the gear 162 to apply a force to the gear 162 in a direction that will move it from its solid line position to its dotted line position as shown in FIG. 12.

When the gear 162 is moved to its dotted line position, the spring 190 will be compressed to a greater extent than it was before this gear movement took place.

The movement of the gear 162 to this new dotted line position will cause the clutch teeth 170 on its left face to be moved to a disengaged-unclutched position with the clutch teeth 196 on the right face of the pulley 198 and will cause the clutch teeth 168 on the right face of the gear 162 to be moved into clutched engagement with the clutch teeth 194 of the gear 192.

The gear 192 is shown in driving relationship with a gear 308 that is press fitted on a shaft 310 and coupled by means of two keys 312, 314 and its associated slot connections 316, 318 with the hub portion 320 of a first cam 322.

A second cam 324 is molded as a single unit to the first cam 322 so that both cams 324 and 322 and the driving gear 308 rotate as a single unit. Cams 324 and 322 are preferably made of a suitable plastic material such as that trade named nylon or an equivalent material.

The right end of the shaft 310 has a single tooth gear 326 mounted thereon that has a pair of spaced-apart keys 328, 330 that engaged key slot 322 and 334 in the hub portion 336 at the right end of the cam 324 so that the rotary motion that is transmitted by the motor 146 and the aforementioned gearing to the cams 332, 324 can be transmitted by the cam 324 to a single tooth gear 326 which is preferably made of the same material as the cams 324, 322. The left end of the shaft 310 has a retaining clip 337 thereon to prevent the shaft 310 from moving to the right.

From the above description it can be seen that the shaft 310, the gear 308, cams 322, 324, and single tooth gear 326 are constructed to rotate as a single unit on the cylindrical punched-out wall surface portions 338, 340 of the chassis plates 148 and 342.

Figure 16:
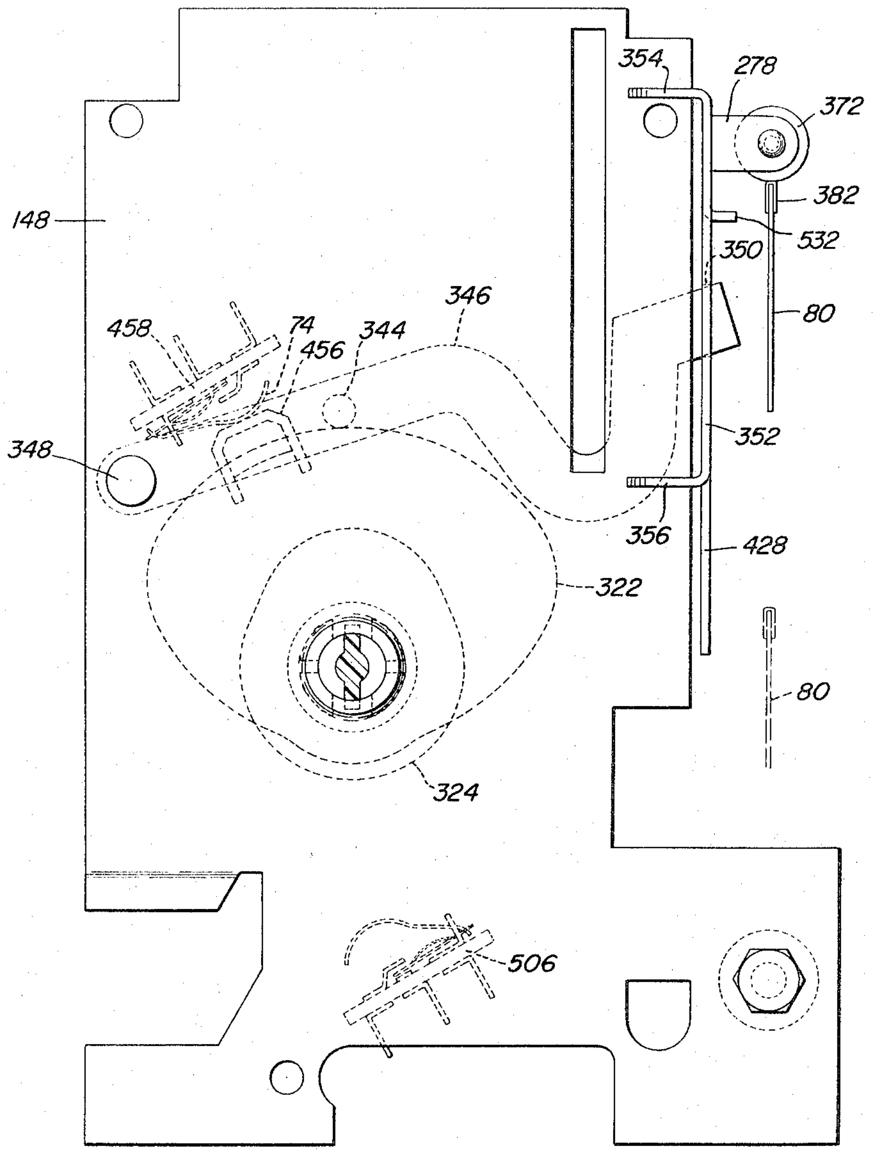
FIGURE 16 is a view of the main and secondary cams shown in FIGURES 12 and 13.
Figure 17:
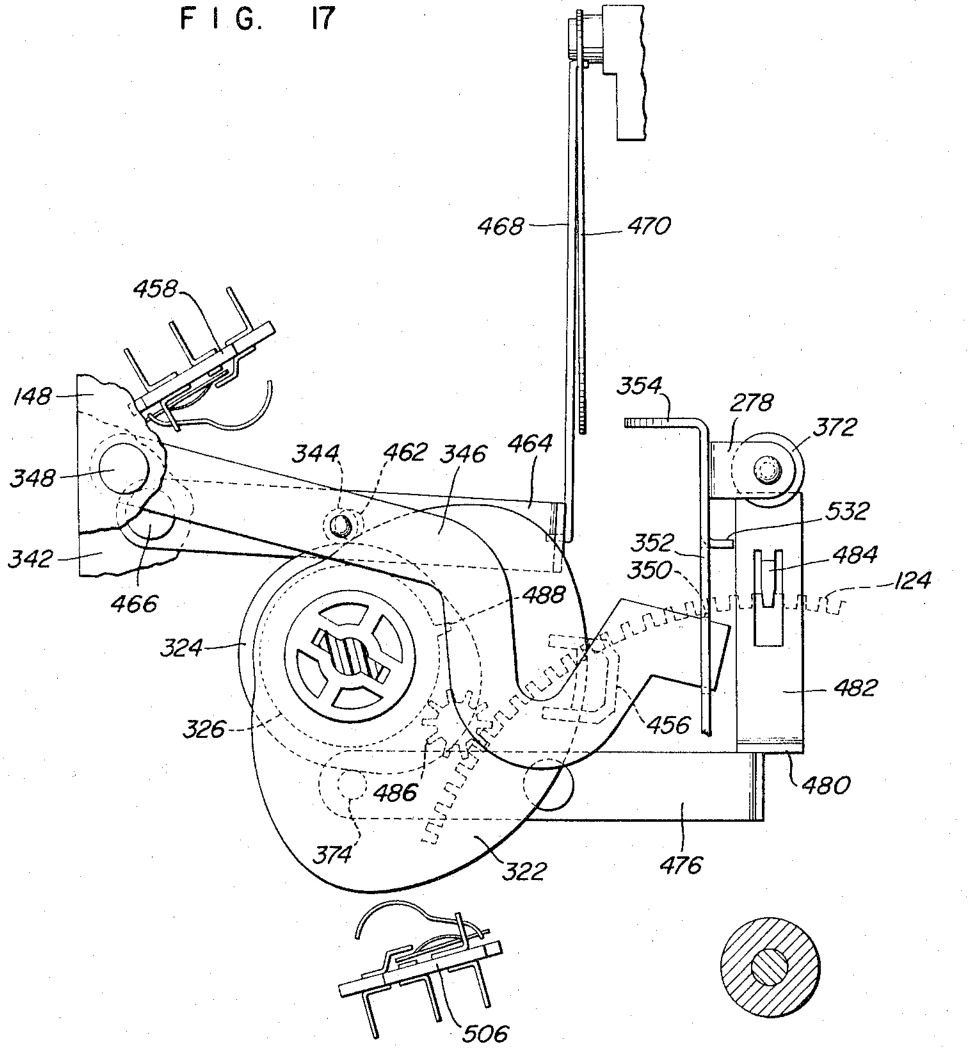
FIGURE 17 shows the position of the slide-lifting drive bar and shutter as this cam-driven, magnet-carrying drive bar is starting to move the slide in an upward position from the tray.

As the main cam 322 is rotated during a slide lifting operation, it moves a pin follower 344 that is fixedly mounted on a drive arm 346 in an upward direction as shown in FIG. 16. As this operation takes place, the drive arm 346 will be rotated in a counter-clockwise direction about a rivet-shaped stub shaft 348 that is fixedly connected to the chassis plate 148.

While this upward movement of the arm 346 takes place the upper free or right end of the drive arm 346 will be moved into lifting sliding engagement with the upper end of a wall 350 forming a slot in the drive bar 352. The length of the wall 350 that forms this slot is purposely made of a greater height than the height of the right end of the drive arm 346 in order to provide freedom of movement for the different portions of the free end of the arm 346 that are brought into alignment with the slot as it is moved about its pivot.

The drive bar 352 is shown in FIG. 10 as having two bent apertured bar portions 354, 356 that have cylindrically-shaped, nylon-bearing inserts 358, 360 therein. These bearings will enable the drive bar 352 to be easily slideably moved by the drive arm 346 along the support shaft 362 when clockwise or counter-clockwise rotation is transmitted by the reversible motor 146 to the cam 322 as shown in FIGS. 16–20.

The shaft 362, in turn, is supported against sidewise movement in two apertured wall portions 364, 366 of the chassis plate 148 and also supported against up and down movement by means of snap-on retaining rings 368, 370 as shown in FIG. 10.

FIG. 21 shows a rotatable magnet 372 having cylindrical portions 374, 376 extending from its opposite ends that rotatably mount the magnet 372 on a U-shaped member 378. The magnet 372 employed herein may be of the same basic type as that disclosed in the Robert F. McCammon Patent 2,999,424 issued Sept. 12, 1961. The aforementioned U-shaped member 378 is, in turn, fixedly connected to the drive bar 352 by means of a buttonhead rivet 380.

When the motor 146 is driving the cam 322 in a forward direction as shown in FIGS. 9, 16 and 11 the magnet will lift the metal clip 382 and the slide 80 to which it is clamped in an upward direction between this slide's lower dotted line or in slide tray position to its slide projecting position.

This slide raising action will take place as the roller 344 is brought into contact with the outer surface portion of the cam 322 whose radial distance from its rotating center is being gradually increased to a point on the cam that is at the farthest radial distance from its center of rotation. When the cam 322 is being driven in this forward direction to lift the roller 344, drive arm 346, drive bar 352 and the magnet 372 and the clip-slide unit 80, 382 attached thereto the side walls of the slide 80 will initially be moved in a freely sliding manner in the grooved-out slide guiding portions 384, 386 in the guide plate 388, 390 as shown in FIGS. 11 and 16. As the slide continues its travel in an upward direction its sides are guided by grooves 392, 394. The first groove 392 is formed in a side support member 396 and is made of a hard plastic material such as a material trade named Bakelite. The support member 396, in turn, is fixedly connected by screws 398 and 400 to a slide editing plate 402 that is of a J-shaped configuration.

The other groove 394 is formed in a second similar plastic member identified by reference numeral 404 in the drawing. This support member 404 contains a pair of spaced apart cup point set screws 406, 408 that extend away from the outer wall of the support member 404 toward the left end of the projector 10.

As shown in FIG. 11, one of the extending portions of the set screw 406 passes through a wall 410 that forms a horizontal slot in the J-shaped editing plate 402. The extending portion of the second set screw 408 passes through a wall 412 that forms a second slot in J-shaped editing plate 402. A curved leaf spring 414 extends between the inner left end of the editing plate 402 and a grooved-out left side of the support member 404 to retain the cup point set screws 406, 408 of support member 404 pressed against the right end of the slots 410, 412 in the J-shaped member 402. A protuberance 416 is shown on the left grooved-out surface of support member 404 over which an apertured wall portion 418 of the spring can be placed in order to prevent slippage of the spring by the force of gravity from the position shown.

This construction provides a spring-biased left end support 404 for a slide as soon as it is moved into its in gate projecting position between the support members 396, 404. This construction also permits the slide to be retained in a supported position between the support members 396, 404 when the knob 420 which is fixedly attached to the slide editing plate 402 is manually pulled out to its slide editing position shown in dotted line form in FIG. 11.

When the slide has been moved into its projecting position as described supra, the top of the slide 80 will be brought into contact with two grooved-out stops 422, 424.

The lower wall surface of the stop 422 and the upper surface or grooved-out part 384 form the narrow top and bottom portions of an apertured inner wall of a substantially rectangular-shaped wall 424 forming the interior of the guide plate 388 through which the editing plate 402 is moved to its dotted or editing position outside the projector 10. The single piece guide plate 388 containing the aforementioned rectilinearly-shaped apertured wall portion and the stop member 422 is fixedly attached by means of a suitable number of screw connections, for example 426, 428, to a metal plate 430. This metal plate 430 contains bent over end portions 432 and 434 and a centrally located apertured portion 436 as shown in FIG. 9. The plate 430 is shown fixedly mounted on the chassis 342.

The guide plate 390 contains the stop portion 424 at its upper end, the slide guide 386 at its central portion and has a slotted wall 438 in a lower portion 440 thereof. This guide plate 390 is fixedly mounted by threaded connecting means 442, 444 to the chassis plate 342. When the cam 322 has passed the previously-referred-to slide in gate projecting position or a position in which its pin follower 344 is at its greatest distance from the center of shaft 310 on which it is rotatably mounted, any additional clockwise rotation of the cam 322 as shown in FIG. 16 will allow the pin follower 344 to be lowered by gravity along with its associated drive arm 346, drive bar 352, the U-shaped member 278, magnet 372, the metal clip 382 and the slide 80 until the slide 80 has been returned to the same position in the tray 20 and into contact with the outer surface of the hub 66 from which it was previously lifted.

When a slide change is thereafter required, a show switch 446 as shown in FIG. 27 is operated and this completes the circuit through the solenoid 182 and the split-phase motor 146. The solenoid plunger 180 acts on two levers 172, 448 in the mechanism. Lever 448 operates the switches 298 and 450 via the adjustable insulating buttons 452 and 454 shown in FIGS. 10 and 13. At this point, switch 298 disconnects the low voltage winding from the motor 146 and shorts out the capacitor 300 leaving capacitor 302 connected across the motor 146. Switch 450, at the same time, disconnects the anode of the silicon-controlled rectifier 306 so that the higher voltage from the line supply will not damage it. The silicon controlled rectifier 304 is protected by the fact that it is shorted out by switch 298. The previously-mentioned second lever 172 actuated by the solenoid 182 moves the gear 162, overcoming the force of spring 190 to engage the face clutch teeth 168 of gear 162 with the clutch teeth 194 of gear 192. The motor rotates in the selected forward or reverse switch direction selected by switch 455 driving gear 192 which, in turn, drives the gear 308 which is attached to the main cam 322. The lobe 456 which forms part of the main cam 322 has been holding switch 458 open and, as soon as the cam 322 has rotated through a small angle, the switch 458 reverts to its normally closed condition and maintains the circuit so that the button operating slide change 446 need not be held depressed by the operator.

*(3) Shutter actuator*

FIGS. 16–20 show the main cam 322 as having a secondary cam 324 attached to it. This secondary cam 324 has been acting on the follower 462 as shown in FIGS. 16–20 so that the lever 464 on its pivot 466 has been held in the up position. A link 468 is used to pivotally connect the free end of lever 464 with the shutter 470. As shown in FIG. 9 the shutter 470 in turn, is shown spring biased to a closed position by a pivoted spring member 471 with respect to the chassis of the projector 10. The purpose of the lever 464 is to keep the shutter 470 swung back on its pivot 472 clear of the optical path during non-projecting portion of the slide projecting cycle. As soon as the cam system turns, the secondary cam 324 lowers the shutter lever 464 so that the shutter 470 drops cutting off the optical path from the slide 80 to the projection lens 220.

Further movement of the cam system causes the main cam 322 through the follower 344 to allow the drive arm 346 to move down to its lower position. A drive bar 352 is mounted on a guide rod 362 and slides freely vertically as previously described under the description of FIG. 10. The drive bar 352 extends into the area of the gate system and carries the magnet 372 to which the slide 80 adheres by means of the clip 382 which is made of magnetizable material. The slide 80 is maintained in correct position in the gate by means of the previously-mentioned slide guides 396 and 404. When the drive arm 346 moves down, gravity causes the drive bar 352 to follow it down and the slide 80 is carried down into the tray 20 being guided additionally on its way down by the groove 384, 386 of fixed guide plates 388 and 390.

*(4) Tray locking tooth mechanism*
*(5) Tray rotating mechanism*

Figure 20:
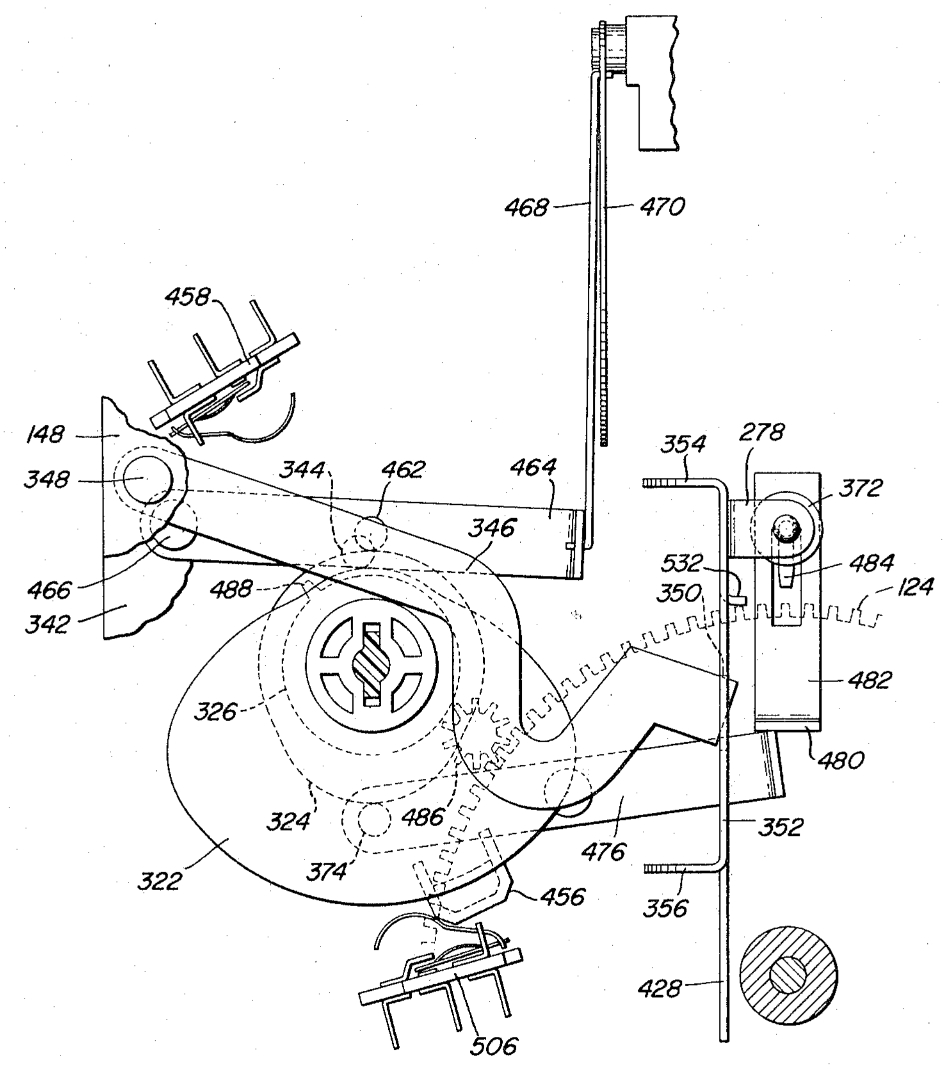
FIGURE 20 shows the position of the slide-lifting drive bar and shutter as this cam-driven, magnet-carrying drive bar has moved the slide back into its original slide tray position and the tray is being rotated to bring the next slide in the tray to a twelve o'clock position.

Only when the slide is in position in the tray, will further rotation of the cam system such as shown in FIG. 20 then cause the secondary cam 324 to act on a follower 474 to move the lever 476 about its stationary pivot 478 to apply an upward force on the tail 480 of the index slide 482, of FIGS. 11 and 20. This action will free the tooth 484 from the teeth 124 of the tray 20 which is then free to rotate except as restrained by the pinion 486 and the V-shaped detent spring 487. This detent spring 487 is fixed at its ends by suitable screw connections **478*a*, 478*b***.

Figure 18:
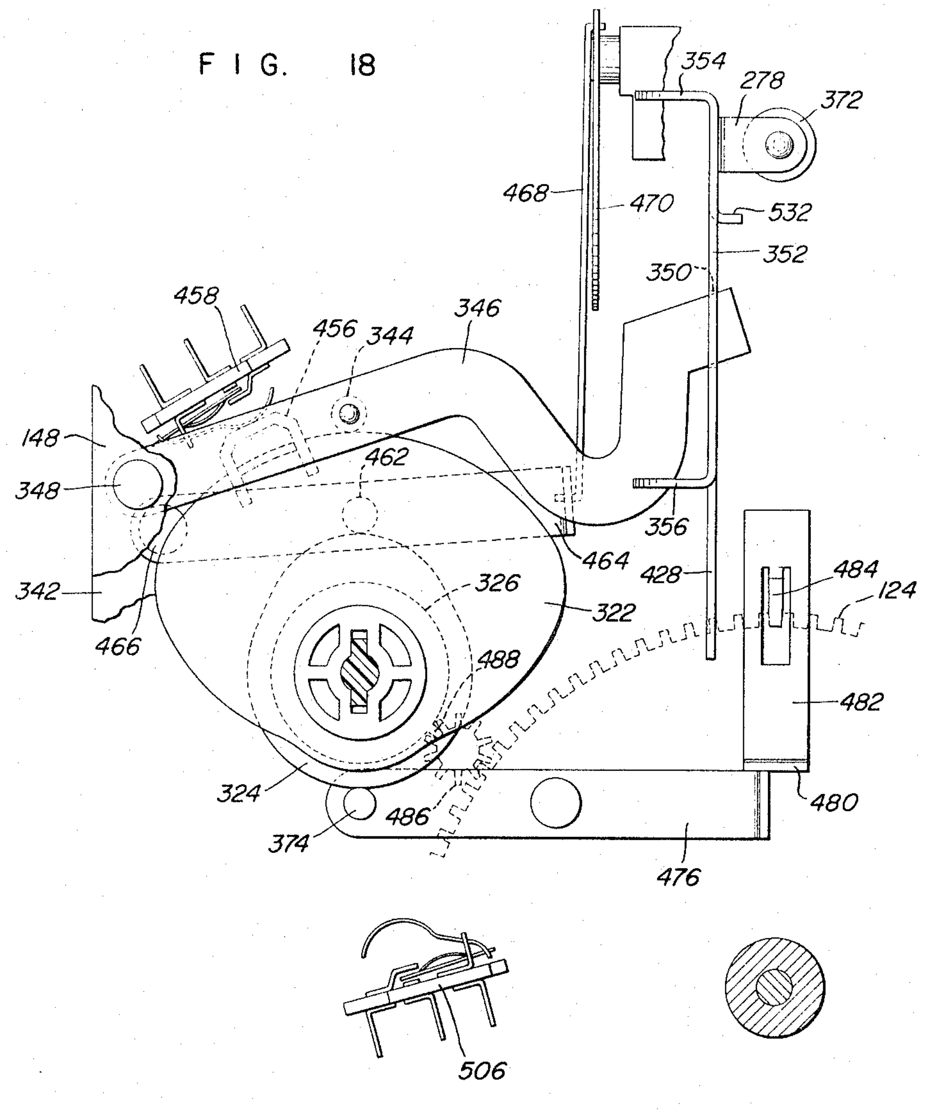
FIGURE 18 shows the "show" position of the slide lifting drive bar and shutter as the aforementioned cam-driven, magnet-carrying drive bar has moved the slide into an in-gate slide projecting position.
Figure 19:
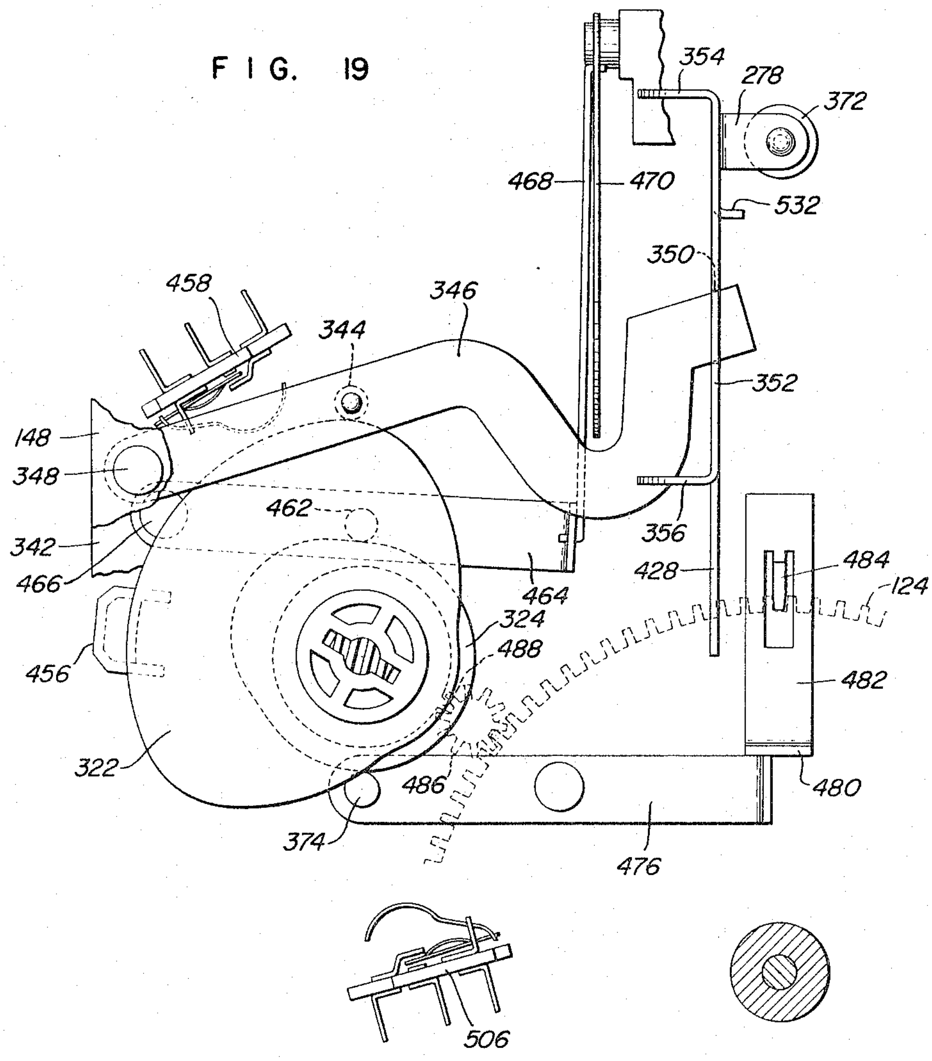
FIGURE 19 shows the position of the slide-lifting drive bar and shutter as this cam-driven, magnet-carrying drive bar is starting to let the slide be returned by gravity to the tray.

Further rotation of the cam system causes the single tooth 488 of the single tooth gear 326 of FIGS. 9 and 12 to engage the pinion 486 to overcome the action of the detent spring 487 and rotate the pinion 486 one tooth in the appropriate clockwise or counter-clockwise direction by the rotation being transmitted thereto by motor 146. This action will cause the tray 20 to be rotated in a step fashion so that the next slide 78 or 82 of FIG. 9 is moved into position under the magnet 372. This next slide will be slide 78 or 82 depending on which direction the motor 146 is selectively positioned to rotate at this time. Continued rotation of the system causes the secondary cam 324 to move away from the follower 474 as shown in FIG. 18. FIG. 11 shows the index slide 482 urged downwards by the spring 490 in the apertured wall 438 of the side guide walls 390 so that the tooth 484 engages in the tray teeth 124 locking the tray 20 in place and pivoting the lever 476 back to its former position. Because the tooth 484, carried by index slide 482 is in slidable relationship with the grooves 124, 486 in the guide part 490, it will automatically make any necessary readjustment to the angular position of the tray 20 so that the slide e.g. 80 will always be accurately located in its correct position in the tray to be drawn up into its gate projecting position.

When this last action has taken place, the cam system continues rotation and the main cam 322 acts on the follower 344, pivoting the drive arm 346 upwards, so that the drive bar 352 moves up carrying the magnet 372 which, in turn, raises the slide 80 to the projection position. The stops 422 and 424 act on the slide 80 stopping it in the proper position. The magnet 372 may or may not remain in contact at the uppermost position, however, the slide 80 will not fall since it is held by the pressure of the outer guide 404 urged inwards by the spring 414.

Finally, the lobe 456 acts on switch 458 through the switch arm 492 and opens the switch 458 so that the solenoid 182 is deenergized, the levers 448 and 172 as shown in FIG. 10 move back under the influence of the spring 190, as shown in FIG. 12. Switches 298 and 450 return to their former position restoring the auto-focus circuit to operation and the gear 162 re-engages with the auto-focus pulley 198.

Figure 22:
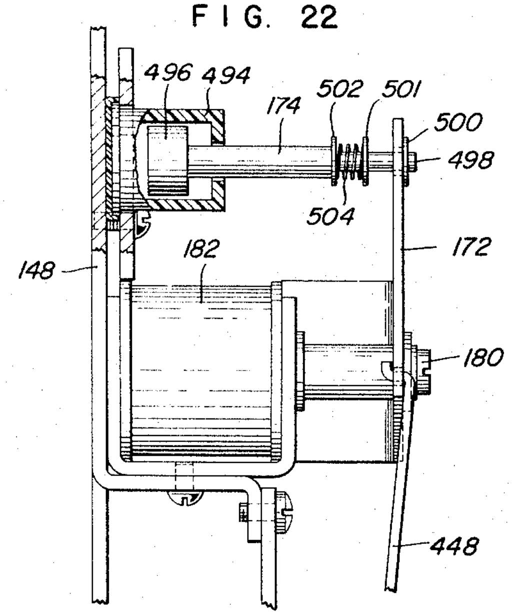
FIGURE 22 shows how a damping device can be connected to the solenoid actuator shown in FIGURES 10 and 13.
Figure 23:
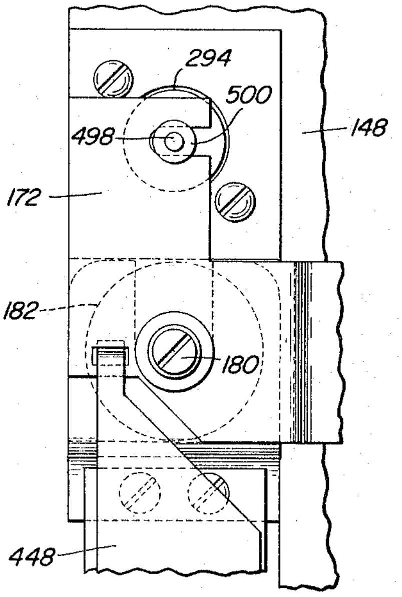
FIGURE 23 shows a right end view of FIGURE 22.

FIGS. 22 and 23 show a preferred embodiment of the above that includes a damper cup 494 and plunger 496. This may be an air system with an O ring seal and a fine orifice (possibly a porous material) or a viscous system using a high viscosity fluid. The plunger shaft 498 passes through the lever 172 between the shoulder 174 and stop 500. When the solenoid 182 pulls the lever 172 the lever 172 acts on the shoulder 174 by way of washer 501, spring 502 and washer 504 and drives the plunger 496 inward. When the solenoid 182 releases, the lever 172 shown in FIG. 12 travels rapidly out to the stop 500, a distance sufficient to disengage the clutch teeth 168 on the moving gear 162 from the clutch teeth 194 on gear 192. The action of the damper system then slows down the remaining travel of the gear 162 so that the clutch teeth 170 do not engage the clutch teeth 196 of the auto-focus pulley 198 until the inertial rotational forces of the motor 146 have been substantially dissipated. This prevents the residual inertia of the motor 146 which is rotating at a higher speed during the slide changing process, from driving the system out of focus during the initial stage in which the motor 146 is switched over from its slide lifting operation to perform its automatic focusing operation. In this manner no de-focusing and re-focusing is unpleasantly apparent in the projected image.

*Load condition*

So far the mechanism has been described moving from the projection of one slide 80 to the next slide 78 or 82, depending on which direction the motor is rotating, with a slide always under projection in the gate. A condition to be hereinafter described as "load" is also required in which the slide 80 in the gate projecting position is returned to the tray 20 and the tray 20 is freed for manual rotation to any position and for removal from the projector 10. FIGURES 16 and 27 show a switch 506 positioned so that the lobe 456 will act upon it when the slide 80 has been returned to the tray 20 and the tooth 484 is disengaged from the tray teeth 124. Under projection position "show" this switch 506 is not in circuit. Movement of the operator-controlled switch 508 from the "show" position to the "load" position shown in FIGURE 27 disconnects switch 458 and connects switch 506 so that the system driven by motor 146 will not stop in the position determined by switch 458 but will rotate to the desired "load" position determined by the switch 506. The switch 508 may also be conveniently used to disconnect the projector lamp 266 when it is not required in the "load" position.

*"Edit" feature*

It is convenient to be able to view slides which are not in the tray 20 or to add or remove single slides without taking the tray 20 from the projector 10.

The guides 396 and 404 are mounted as previously described on the plate 402. This plate 402 can be slid outward in the plane of the slide 80 so that the two guides 396, 404 and the slide 80 held in them are brought outside the case of the projector as shown in FIGURE 11. The slide 80 can then be removed or changed or another slide inserted if the position is vacant. A leaf spring 512 acting on slot 514 in plate 430 and slot 516 in the plate 402 provide a firm V-shaped detent 403 when the plate 402 is inward and acts as a slide stop to prevent the plate from being slid all of the way out of the front side of the projector 10.

*Interlock system*

It is desirable to interlock some of the functions of the projector 10 so that no incorrect operation that is initiated by the operator or by a malfunction occurring in the parts of the projector will be allowed to damage its slide 80, etc., or the other parts of the projector.

An interlock or index lock cam 518 as shown in FIGURES 10, 24–26 is so shaped and located that it will provide the following interlocks:

(a) If the drive bar 352 does not travel downwards until the slide 80 is back in the tray 20, the cam 518 will prevent rotation of the tray 20. This action is necessary because, if the slide 80 is still in the gate or projecting position and the tray 20 rotates, the next slide "change" operation will attempt to raise the second-mentioned slide 78 or 82 into a position occupied possibly by the first slide 80. On the other hand, if the first slide 80 has moved from the gate projecting position but not fully into the tray 20, rotation of the tray 20 under this condition would cause serious damage to the slide 80 and the associated part of the projecting mechanism itself.

(b) The "edit" slide operation must only be possible when the drive bar 352 is at the top of its travel, for example in the "show" position shown in FIGURE 27. Otherwise the user could try to load slides into already occupied positions or could pull the plate 402 outward when the mechanism is in motion with resulting damage to the slide or projector.

(c) The system must be "fail safe" if the user leaves the "edit" plate 402 pulled outward and attempts to operate the slide-lifting mechanism.

(d) The tray 20 must only be allowed to be indexed by the mechanism or by hand when the drive bar 352 and magnet 372 are in the down position, for example when there is no slide in the gate-projecting position.

Figures 24, 25, 26:
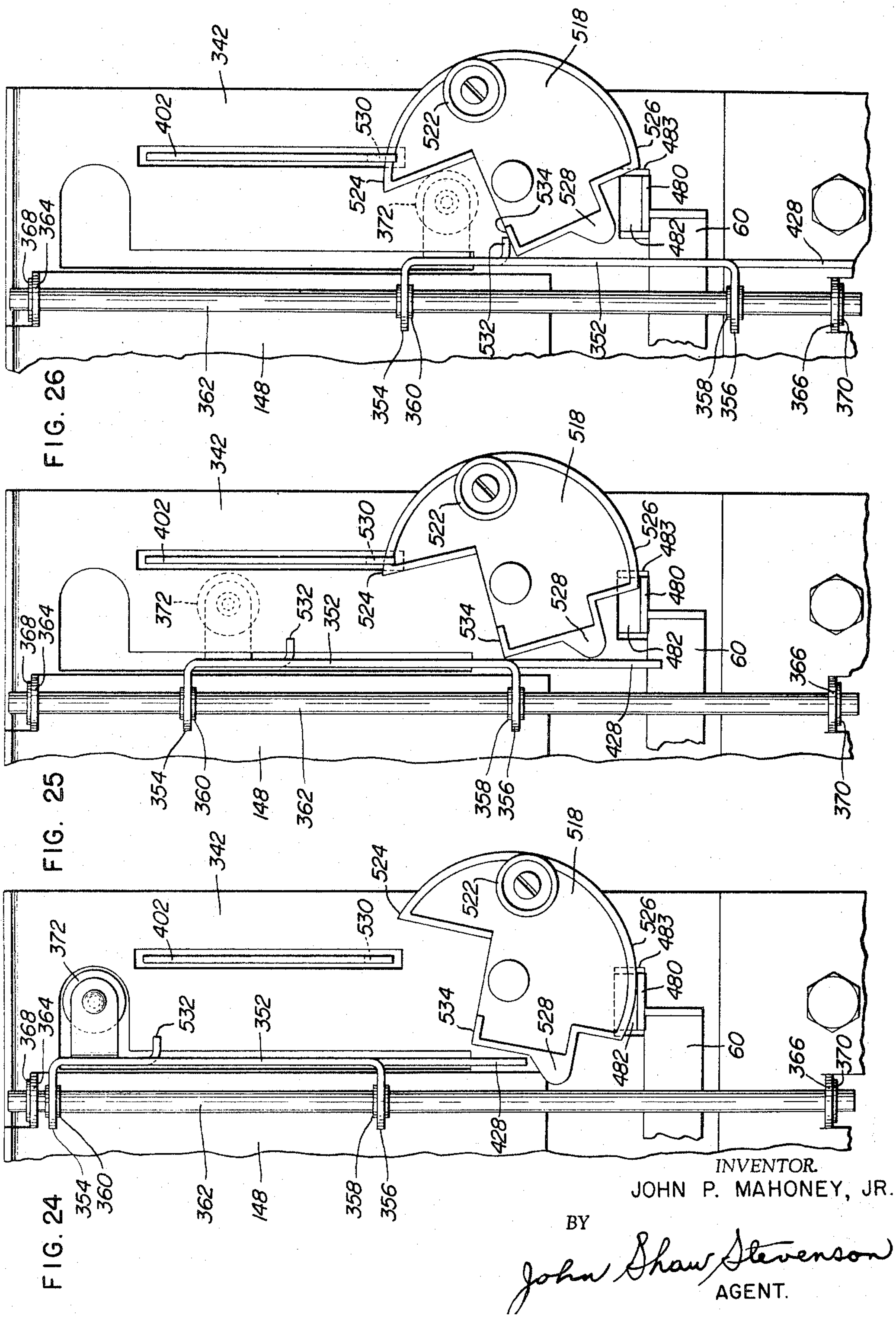
FIGURE 24 shows an up or "show slide" position of the index lock cam and its associated linkage.
FIGURE 25 shows the lock cam of FIGURE 24 rotated counterclockwise to a position in which no editing of the slides can take place.
FIGURE 26 shows the drive bar at its lowermost position and its lug thereof as having rotated the interlock cam further in a counter-clockwise direction.

These requirements are met by the action of the index lock cam 518 shown in FIGURES 10 and 24–26. FIGURE 24 shows the drive bar 352 in the up or "show" slide position and the cam 518 rotated to its maximum clockwise position by the gravity weighted member 522 mounted thereon. Under this condition, the point 524 of the cam 518 is clear from the editing plate 402 which can be operated as described earlier under "Edit" Feature. At the same time, the constant radius section 526 of the cam 518 is located above the tail 480 of the index slide 482 which passes through apertured wall 483 so as to prevent any applicable upward movement of the hook 484 of the index slide 482 shown in FIGURE 11.

In FIGURE 25, the drive bar 352 has moved down part way so that the tail 480 of the drive bar 352 has acted on the lobe 528 of the index lock cam 518 rotating the latter counter-clockwise to a new position. The point 524 has passed through notched-out wall portion 530 in the edit plate 402 to prevent the aforementioned editing operation from taking place while part of the constant radius section 526 of the cam 518 remains in position above the tail 480 of the index slide 482. This condition persists throughout the major part of the downward travel of the drive bar 352 so that if the latter should be stopped for any reason, such as a slide coming in contact with a projector part, the secondary cam 324 will be unable to raise the index tooth 484 and the mechanism will stall. When this happens, the clutch teeth 168 and 194 transmitting the drive from gear 162 to gear 192 are so shaped that they force the clutch teeth 168 of the movable gear 162 to be moved axially as the rotation of the motor causes them to ride over the then stationary clutch teeth 194. This latter action causes a clicking or ratcheting noise which is useful as a signal to the operator that an uncorrect condition exists.

If conditions are normal, then the drive bar 352 will move down to the bottom of its travel and the lug 532 on the drive bar 352 contacts the shoulder 534 of the index interlock cam 518 causing a further counter-clockwise rotation of the cam 518. Since the constant radius section of the cam 518 is now clear of the tail 480 of the index slide 482, this index slide 482 is now free to move under the action of the secondary cam 324 as previously described. The upper part of the cam 518 in the FIGURE 26 position remains engaged in the notch 530 of editing plate 402 to prevent the plate 402 from being moved to an "Edit" position.

During the upward travel of the drive bar 352, the conditions are identical except for sequence. The index lock cam 518 is shaped and weighted at 522 so as to be urged by gravity in a counter-clockwise direction, but a light spring (not shown) could be alternatively used.

One unique feature of this mechanism is the use of a single reversing motor 146 of FIGURE 10 and a system which drives in opposing directions to provide "forward" drive as shown in FIGURES 12 and 16 and the "reverse" operation as shown in FIGURE 12 and FIGURES 17–20. This eliminates the unnecessary practice of using a conventional motor drive mechanism to drive a tray pinion in one direction and to use another separate drive mechanism to drive it in the opposite direction.

Another added advantage of extreme value that is derived through the use of the single reversing motor drive is that when any sort of mechanical or other type of fault condition arises, the operator can move the switch 555 to obtain the opposite direction of operation to the one in which the trouble occurred. This latter action will allow the mechanism to thereby immediately "back away" from the trouble to the point from which it started and come to rest. This gives the operator an opportunity to correct any sort of mechanical or other fault condition with a minimum of trouble on his part.

| Reverse action (FIGS. 17 to 20): | Forward action (FIG. 16) |
|---|---|
| (1) Start at "Show" position shown in FIG. 18 | Start at "Show" position shown in FIG. 16. |
| (2) Impulse from "Reverse" button **536** starts cam **322** in a counter-clockwise direction | Impulse from "Forward" button switch **536** starts cam **322** in a clockwise direction. |
| (3) Switch **458** closes, cam **322** continues in a counter-clockwise direction | Switch **458** closes. Cam **322** continues clockwise. |
| (4) The shutter **470** closes | Shutter **470** closes. |
| (5) Drive bar **352** descends under gravity | Drive bar **352** descends under gravity. |
| (6) Index lock tooth **484** rises freeing tray | Index lock tooth **484** rises freeing tray. |
| (7) Cam switch lobe **456** passes switch **506** | Single tooth gear **326** drives pinion **486** and therefore tray **20** one tooth space. |
| (8) Single tooth gear **326** drives pinion **486** and therefore tray **20** one tooth space | Cam switch lobe **456** passes switch **506**. |
| (9) Index lock tooth **484** comes down, locking and positioning tray **20** | Index lock tooth **484** comes down, locking and positioning tray **20**. |
| (10) Drive bar **352** rises driven by cam **322** | Drive bar **352** rises driven by cam **322**. |
| (11) Shutter **470** opens | Shutter **470** opens. |
| (12) Switch **458** opens and mechanism stops in "Show" | Switch **458** opens and mechanism stops in "Show." |

*Elevate and tilt mechanism (FIGURES 1, 10 and 13)*

The projector 10 is provided with a single fixed foot 58 adjacent its right end and two adjustable feet 540, 542 adjacent its left end. The front feet 540, 542 are attached to their associated rods 54, 56 that pass through their respective walls 548, 550 that form clearance openings in the respective base parts 34, 36 of the projector 10 and then through their associated non-aligned walls 552, 554; 556, 558 that form clearance holes in the flange of the channel-shaped chassis support bracket 559. Each pair of walls 552, 554; 556, 558 is, therefore positioned with respect to one another so that each rod 54, 56 has its upper end tipped inward at a small angle to the vertical shown in FIGURE 13. Located between the two rods 54, 56 and urged upward by the spring 560 is a locking piece 561 forming leg-engaging parts of a locking piece or brake 562. The brake 562 is fixedly connected to the link 564 by means of the rivets 566, 568. The depression of a knob 570 that is mounted on the top end of the link 564 overcomes the force of the spring 560 as it is moved downwardly out of frictional engagement with the rods 54, 56 as the spring 560 is guided by the tab 576 that is fixedly connected to the bracket 559 so that the rods 54, 56 are free to move axially. While the rods 54, 56 are free, the projector 10 may be raised and lowered or tilted laterally about the longitudinal center line of the base on its foot 538.

The aforementioned construction for the support legs or rods 54, 56 of the projector 10 will enable either one of its two leg portions 54, 56 to be mounted in any one of a number of a variety of extended positions on one support surface while its other leg 56 or 54 is mounted in any one of a different number of other extended positions on the same or a different support surface that is at the same level or which is at a different level than that on which the first-mentioned leg is mounted.

As soon as the then depressed knob 570 is released, the portions 572, 574 on the opposite ends of the brake part 561 are urged by the force of spring 560 so that the two rods 54, 56 are forced outward against the lower outer edge portions of their associated apertured walls 552, 554; 556, 558 and thereby locked in the desired position by the wedging action of the locking piece 561 in the shallow angle area that is formed between the two legs 54, 56. The weight acting on the two legs 54, 56 is also employed to increase the aforementioned locking action after the knob 570 has been released.

One preferred way of mounting the aforementioned support bracket 559 directly on the chassis of the projector 10, is as shown in FIGURE 10. With the FIGURE 10 construction, a wall 578 forming a U-shaped slot in the end of the stationary rectangular chassis plate 580 is shown having a threaded screw connecting means 582 extruding therethrough and through an aperture 584 in the webbed portion of the channel-shaped bracket 559. An n-shaped spring clip 586 is shown mounted at one of its ends between a spring washer 588 and the right surface of the chassis plate 580 and at its other end in spring engaging surface contact with the inner vertical surface of the bracket 559.

A left upper portion of the spring clip 586 is shown passing through a wall 590 that forms an aperture in the bracket 559 and another wall 592 that forms an aperture in the upper end of the chassis plate 580. A spring retaining means 593 is shown mounted in a grooved-out surface portion 594 to retain the central portion of the bracket 559 and central portion of the spring clip 586 in fixed relation with the chassis plate 580. This construction thus enables the lower and upper flange portions 596, 598 to always have a spring bias applied thereto so that the aforementioned leg retaining function which these bracket flange portions perform can be carried out in an efficient manner for the life of the projector 10.

From the aforementioned description, it can be seen that a fully-loaded, easily transportable, more compact, less cumbersome, unique construction for a projector-slide tray unit has been disclosed that has a single multi-purpose motor for sequentially driving a magnetizable slide lifting actuator, an automatic projector lens focusing device, a shutter, a slide lowering interlock device, a tray locking and tray releasing device and a tray advancing and reversing device as well as providing a single gate into which the slides may be projected and edited without jamming.

What is claimed is:

1. A slide actuator for a projector, comprising a motor, a first cam rotatably driven by the motor, a follower in physical surface to surface operable contact with the outer surface of the cam to move a drive arm to which it is attached in a vertical direction about a pivot during an initial movement of the cam, a drive bar slidably connected for vertical movement along a stationary guide bar, a wall in the bar forming a slot therein to accommodate the passage of the free end of the arm therethrough and the vertical movement of the drive bar therewith, a rotatable magnet operably mounted for vertical movement with the drive bar to lift a clip and a slide in the tray to which the clip is attached in a vertical direction out a rim portion of the tray through a groove in a stationary guide and into an editing gate where the slide is projected, and the cam being further constructed of a shape that will allow the lowering of the follower, the drive arm, the drive bar, the magnet and the slide solely by the force of gravity into its original tray position during further movement of the cam.

2. An apparatus to edit a slide that is in a projecting position in a projector, comprising a gate having a first grooved-out portion therein to receive and contact one side portion of the slide and having a second opposite spring-biased grooved-out portion to receive and retain the other opposite side portion of the slide within the grooves, an extensible plate means positioned within the projector forming a slide supporting gate plate that is slideably mounted thereon on which the first grooved portion is fixedly mounted and on which the second grooved portion is slidably mounted, a knob mounted on one end of the gate plate to manually slide the gate plate and the slide retained therein out an open front wall of the projector for editing.

3. The slide editing apparatus defined by claim 2 wherein the gate plate has a wall forming a slot passing through its front and rear face, and a spring-biased detent which is fixedly attached to a stationary part of the projector is positioned to retain a spring force against the gate plate when it is moved from a projecting position toward an editing position and to drop into spring-biased engagement with the walls forming the slot when the gate plate is moved into its editing position.

4. A tray index locking apparatus for preventing a tray from being rotated until a slide lifting mechanism of a projector has returned a slide from its slide projecting position to its tray position, comprising a spring-biased hook mounted for slidable movement in the projector and constructed to be normally spring-biased into engagement between a pair of teeth which form a part of a gear on the outer rim of the tray, a tail member extending from a slidable portion of the hook, a motor driven first cam, a follower to move a drive arm to which it is attached in a vertical direction about a pivot to raise the tail member and release the hook from the tray teeth, a pivot pin, a second cam, a weight on one portion of the second cam to allow gravitational force to rotate it in one direction about the pivot pin into contact with the tail member to prevent it from being raised in a vertical tray-hook release direction, and a slide carrying drive bar member having a lug thereon positioned to contact and rotate the second cam in an opposite direction to bring a non-contacting portion of the second cam adjacent the tail member only when the slide is returned to its in-tray position.

5. The tray index locking apparatus defined by claim 4, wherein a bottom wall portion of the gate plate is slotted, the vertical slide-moving drive bar member is employed to allow vertical movement of a slide in both directions between an in-tray position and an in-gate projecting position, the eccentrically weighted gravity actuated cam is pivotally mounted to rotate in one direction about a pin pivot on which it is mounted to a position that is clear and to one side of the slot in the bottom wall of the gate plate when the vertical slide-moving drive bar has moved the slide into its in-gate and editing position and wherein a lug on the drive bar is operably positioned to rotate a side edge portion of the cam into the slot in the bottom of the gate plate when the drive bar has returned the slide to the tray and thereby prevent the gate plate from being moved from its projecting slide receiving position to its editing position.

6. A slide projecting apparatus, comprising a single motor, a first gear driven by the motor having clutch teeth formed on its opposite face surfaces, a pulley forming a drive portion of an automatic projector lens positioning system having clutched teeth in driving engagement with the clutched teeth on one of the faces of the gear, a second gear operably connected to drive a slide lifting-gravity lowering unit having clutched teeth on one of its faces positioned to face the other clutch teeth on the first gear, a spring extending between a hub portion of the slide driving gear and a hub portion of the first gear to separate their clutched teeth and to normally maintain the other clutched teeth of the first gear in engagement with the clutch teeth on the pulley, the spring being positioned to surround a stationary stub shaft on which the first gear, pulley and second gear are rotatably mounted, a solenoid, a lever pivoted at one end and operably connected to the solenoid at its other end for movement about the pivot to thereby automatically move the first gear out of clutched driving engagement with the pulley and into clutched driving engagement with the slide driving gear when the solenoid is energized and its plunger is moved to a pulled-in position.

7. The slide projecting apparatus of claim 6 wherein, the pulley gear is employed to transmit rotary motion by way of a belt drive and second pulley to a face cam and wherein a pin mounted for slidable movement in the face cam is employed to adjust the position of a projector lens carrier to which the other end of the pin is fixedly attached.

8. The projecting apparatus of claim 6 wherein, the pulley gear is employed to transmit rotary motion by way of a belt drive and a second pulley to a face cam and wherein a pin mounted for slidable movement in the face cam is employed to adjust the position of a projector lens carrier to which the other end of the pin is attached and wherein the top and bottom end portions of the projector lens carrier is of an elongated V-shaped configuration, a pair of plates fixedly connected to a stationary wall of the projector and in space relationship with the V-shaped ends, and wherein spheres are positioned in supporting rolling engagement between the sides of each of the V-shaped ends of the carrier and the side plates to enable the pin to move the lens carrier towards an in-focused position.

9. The slide projecting apparatus defined by claim 6, wherein the clutch teeth on the complementary face surfaces between the first gear and pulley and between the first gear and the second gear are of a preselected shaped configuration to enable the motor driven first gear to slide over the pulley and the second gear face clutch teeth when they are serially brought into contact with one another and the rotary motion of the motor is not being transmitted by either of the last two mentioned parts and thereby produce an audible clacking danger signal when a slide lifting or other operation that an operator desires to perform cannot be performed due to an obstruction in the projector.

10. A slide projector comprising a single reversible motor, a photo electric sensing balancing circuit operably connected to sense the degree to which a slide in the projector is out of focus and to produce an electrical signal that is proportionate thereto, the balancing circuit being operably connected to automatically drive the motor in a direction that will cause the motor to drive a projector lens adjusting carriage on which a portion of the sensing circuit is mounted into its exact focusing position with the slide and to bring the sensing circuit to a balanced position during an automatic focusing cycle of the motor and when no slide lifting operation is occurring, an electromechanical means for disconnecting the motor from the electric sensing balancing circuit and its driving connection with the carriage while it simultaneously operably connects the motor in driving relationship with a slide actuating mechanism during a slide projecting cycle.

11. The slide projector as defined by claim 10, wherein a dampening unit is operably connected to the electromechanical means to dissipate the inertial forces of the motor when it has just completed its slide moving function and it is being disconnected by the electro-mechanical to perform its automatic focusing function.

References Cited

UNITED STATES PATENTS

| | | | |
|---|---|---|---|
| 1,069,521 | 8/1913 | Bernard | 40—36 |
| 2,936,672 | 7/1958 | Richards | 88—28 |
| 3,209,674 | 10/1965 | Hall | 88—28 |
| 3,217,595 | 11/1965 | Gallina | 88—28 |
| 3,276,314 | 10/1966 | Robinson | 88—28 |

NORTON ANSHER, *Primary Examiner.*

W. M. FRYE, *Assistant Examiner.*